US012149420B2

(12) United States Patent
Enhorning et al.

(10) Patent No.: US 12,149,420 B2
(45) Date of Patent: Nov. 19, 2024

(54) FEEDBACK APPARATUS AND METHOD FOR DYNAMIC CONTROL OF AN E-COMMERCE PLATFORM

(71) Applicant: KPI KARTA INC., Toronto (CA)

(72) Inventors: Peder Enhorning, Toronto (CA); Eric Todd Tobias, Vancouver (CA)

(73) Assignee: KPI KARTA INC., Toronto (CA)

( * ) Notice: Subject to any disclaimer, the term of this patent is extended or adjusted under 35 U.S.C. 154(b) by 10 days.

(21) Appl. No.: 18/223,227

(22) Filed: Jul. 18, 2023

(65) Prior Publication Data

US 2024/0031251 A1 Jan. 25, 2024

Related U.S. Application Data

(60) Provisional application No. 63/390,802, filed on Jul. 20, 2022.

(51) Int. Cl.
*H04L 41/5009* (2022.01)
*H04L 41/5025* (2022.01)

(52) U.S. Cl.
CPC ...... *H04L 41/5009* (2013.01); *H04L 41/5025* (2013.01)

(58) Field of Classification Search
CPC ........................ H04L 41/5009; H04L 41/5025
See application file for complete search history.

(56) References Cited

U.S. PATENT DOCUMENTS

| | | | | |
|---|---|---|---|---|
| 8,255,524 | B2 * | 8/2012 | Devitt | H04L 41/149 709/224 |
| 9,999,805 | B2 * | 6/2018 | Ahuja | G06F 3/0304 |
| 10,135,287 | B2 * | 11/2018 | Yuasa | H01F 38/14 |
| 10,938,661 | B1 * | 3/2021 | Pignataro | H04L 41/12 |
| 10,949,788 | B2 * | 3/2021 | Wilson | G06Q 10/06393 |
| 11,809,267 | B2 * | 11/2023 | Gusat | G06F 11/0709 |
| 2009/0281845 | A1 | 11/2009 | Fukuda et al. | |
| 2010/0077077 | A1 * | 3/2010 | Devitt | H04L 41/147 709/224 |

(Continued)

FOREIGN PATENT DOCUMENTS

WO WO-2021222384 A1 11/2021

OTHER PUBLICATIONS

Hesse et al., "Visualizing time-dependent key performance indicator in a graph-based analysis", Proceedings of the 2014 IEEE Emerging Technology and Factory Automation, Sep. 1, 2014.*

(Continued)

*Primary Examiner* — Todd L Barker
(74) *Attorney, Agent, or Firm* — Perry + Currier Inc.

(57) ABSTRACT

A feedback apparatus and method for dynamically controlling e-commerce platforms comprising a central engine is configured to connect with an e-commerce platform associated with a plurality of communication devices and a plurality of engagement engines and fulfillment engines that interact with the communication devices; the central engine is configured to dynamically add, remove or adjust the computational resources in the e-commerce platform in order to achieve a target efficiency for engagements with the communication devices and fulfillments from the communication devices. A graphical interface for controlling the feedback apparatus is also provided.

20 Claims, 20 Drawing Sheets

(56) References Cited

U.S. PATENT DOCUMENTS

| | | | | |
|---|---|---|---|---|
| 2014/0157142 | A1* | 6/2014 | Heinrich | G06F 3/0412 715/744 |
| 2016/0103918 | A1 | 4/2016 | Alekseyev et al. | |
| 2020/0236562 | A1* | 7/2020 | Soundrarajan | H04W 24/04 |

OTHER PUBLICATIONS

Abe et al, "Analyzing Business Processes by Automatically Detecting KPI Thresholds", IEEE International Conference on Services Computing, Jun. 1, 2016.*

Unilytics Corporation, Unilytics simplifies the understanding, calculation and measuring of Key Performance Indicators (KPIs), unilytics.com, Nov. 2, 2010.

Unilytics Corporation, "KPI Karta", brochure, date unknown, unilytics.com.

Enhorning, Peder, "Digital Analytics Reporting Services Proposal", version 1.0, Jan. 17, 2017, Unilytics Corporation.

Unilytics, "Business Intelligence & Analytics Solutions", brochure, date unknown, unilytics.com.

Unilytics Corporation, "KPI Karta—Actionable Key Performance Indicators", 2014, unilytics.com, URL: http://unilytics.com:80/services-2/kpi-karta, Retrieved from The Wayback Machine at URL: https://web.archive.org/web/20140804122922/http:/unilytics.com/services-2/kpi-karta on Oct. 18, 2023.

Unilytics, "KPI-Karta", Jun. 1, 2016, unilytics.com, Retrieved from the Internet on Nov. 3, 2023 from URL: https://unilytics.com/dont-visualize-what-you-cant-see/kpi-karta/.

* cited by examiner

FEEDBACK APPARATUS AND METHOD FOR DYNAMIC CONTROL OF AN E-COMMERCE PLATFORM

CROSS-REFERENCE TO RELATED APPLICATION(S)

This application claims the benefit of U.S. Provisional Patent Application No. 63/390,802, filed Jul. 20, 2022, entitled "FEEDBACK APPARATUS AND METHOD FOR DYNAMIC CONTROL OF AN E-COMMERCE PLATFORM"; the entire contents of which are incorporated herein by reference.

BACKGROUND

In recent years e-commerce platforms have massively scaled and continue to do so. Accordingly, efficient use of network and computing resources is suffering leading to waste.

SUMMARY

An aspect of the specification provides a feedback apparatus and method for dynamically controlling e-commerce platforms comprising a central engine is configured to connect with an e-commerce platform associated with a plurality of communication devices and a plurality of engagement engines and fulfillment engines that interact with the communication devices; the central engine is configured to dynamically add, remove or adjust the computational resources in the e-commerce platform in order to achieve a target efficiency for engagements with the communication devices and fulfillments from the communication devices.

BRIEF DESCRIPTION OF THE DRAWINGS

Various embodiments of the present invention will now be discussed, by way of example only, with reference to the attached figures.

FIG. 10 and FIG. 11 show the same information.

DETAILED DESCRIPTION

Various embodiments of the present invention will now be discussed, by way of example only, with reference to the attached figures.

The above-mentioned aspects will be understood by the discussion below in relation to certain non-limiting example embodiments. Such example embodiments are described with reference to certain systems, devices, methods and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, a special purpose computer, or other programmable data processing apparatus to produce a special purpose and unique machine, such that the instructions, which execute via the processor of the computer or other programmable data processing apparatus, create means for implementing the functions/acts specified in the flowchart and/or block diagram block or blocks. The methods and processes set forth herein need not, in some embodiments, be performed in the exact sequence as shown and likewise various blocks may be performed in parallel rather than in sequence. Accordingly, the elements of methods and processes are referred to herein as "blocks" rather than "steps."

These computer program instructions may also be stored in a computer-readable memory that can direct a computer or other programmable data processing apparatus to function in a particular manner, such that the instructions stored in the computer-readable memory produce an article of manufacture including instructions, which implement the function/act specified in the flowchart and/or block diagram block or blocks.

The computer program instructions may also be loaded onto a computer or other programmable data processing apparatus that may be on or off-premises, or may be accessed via the cloud in any of a software as a service (SaaS), platform as a service (PaaS), or infrastructure as a service (IaaS) architecture so as to cause operational blocks to be performed on the computer or other programmable apparatus to produce a computer implemented process such that the instructions, which execute on the computer or other programmable apparatus, provide blocks for implementing the functions/acts specified in the flowchart and/or block diagram block or blocks. It is contemplated that any part of any aspect or embodiment discussed in this specification can be implemented or combined with other aspects or embodiments discussed in this specification.

Various advantages and features consistent with the present specification will become apparent from the following description with reference to the drawings.

Figure 1:
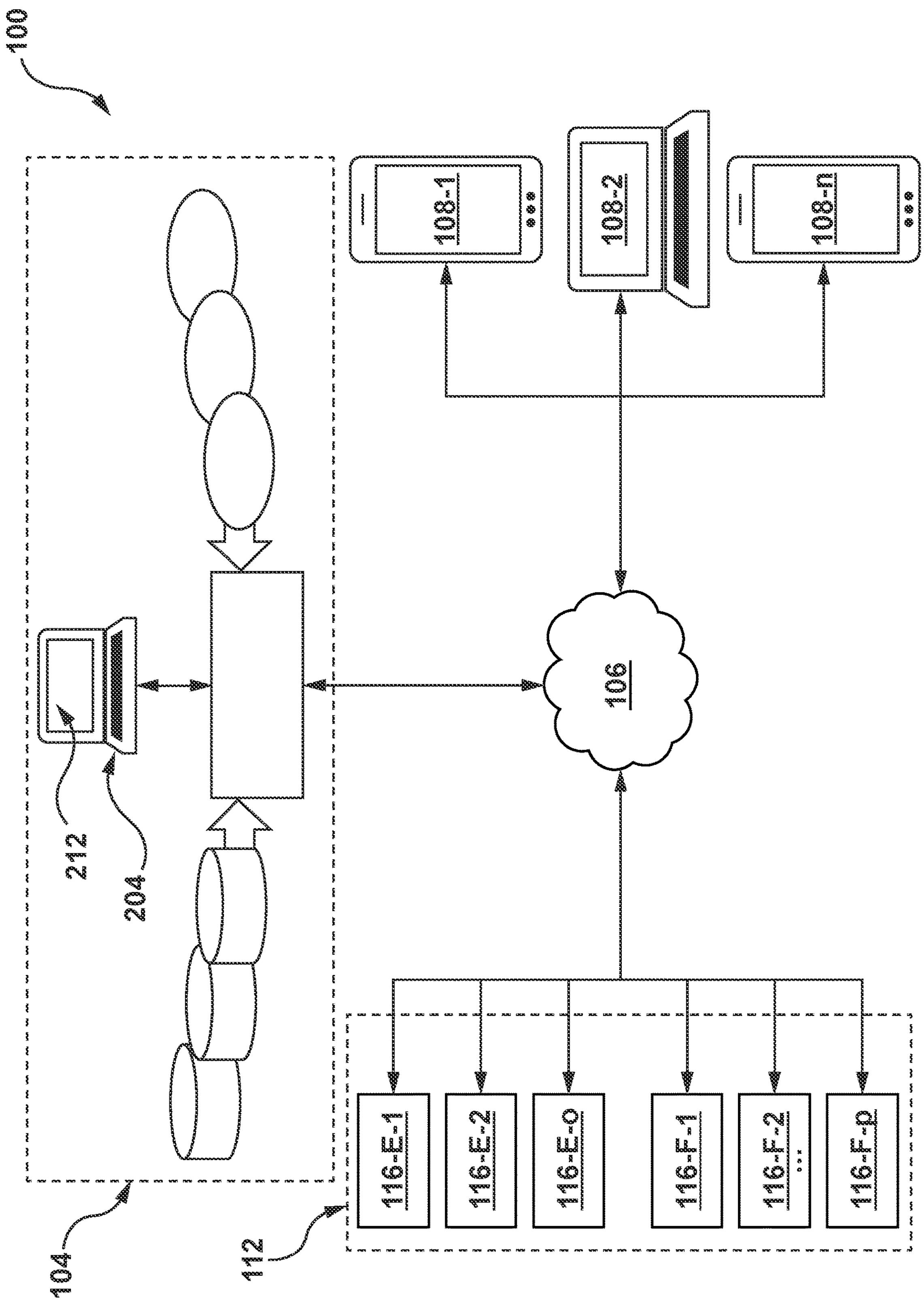
FIG. 1 shows a system for dynamic control of an ecommerce platform.

Referring now to FIG. 1, a system for dynamic control of an e-commerce platform is indicated generally at 100. The locus of the system 100 is a central engine 104 that is connectable via a network 106 to at least one communication device 108-1, 108-2 . . . 108-*n*. (Collectively, the communication devices 108-1, 108-2 . . . 108-*n* will be referred to as communication devices 108, and generically, as communication device 108. This nomenclature is used elsewhere herein.)

Central engine 104 is also connectable to at least one e-commerce platform 112. As used herein, e-commerce platform 112 comprises a plurality of computing engines 116, including at least one engagement engine 116-E and at least one fulfilment engine 116-F. (It is to be emphasized that while a plurality of engagement engines 116-E and fulfillment engines 116-F are shown in FIG. 1, one or more of at least one of them is within scope of this specification.) The dashed lines depicting the box surrounding e-commerce platform 112 represent that the sets and combinations of computing engines 116 are not particularly limited, and various computing engines 116 need not be actually controlled, owned or operated directly by central engine 104, and indeed the given set of computing engines 116 within platform 112 can be added or removed as part of the teachings herein. It will become apparent that such dynamic nature of e-commerce platform 112 represents one of the network and computing resource allocation advantages of the present specification, as engines 116 are dynamically provisioned towards approaching a target efficiency or maximization or otherwise desired optimization of interactions between communication devices 108 and engines 116.

Figure 2:
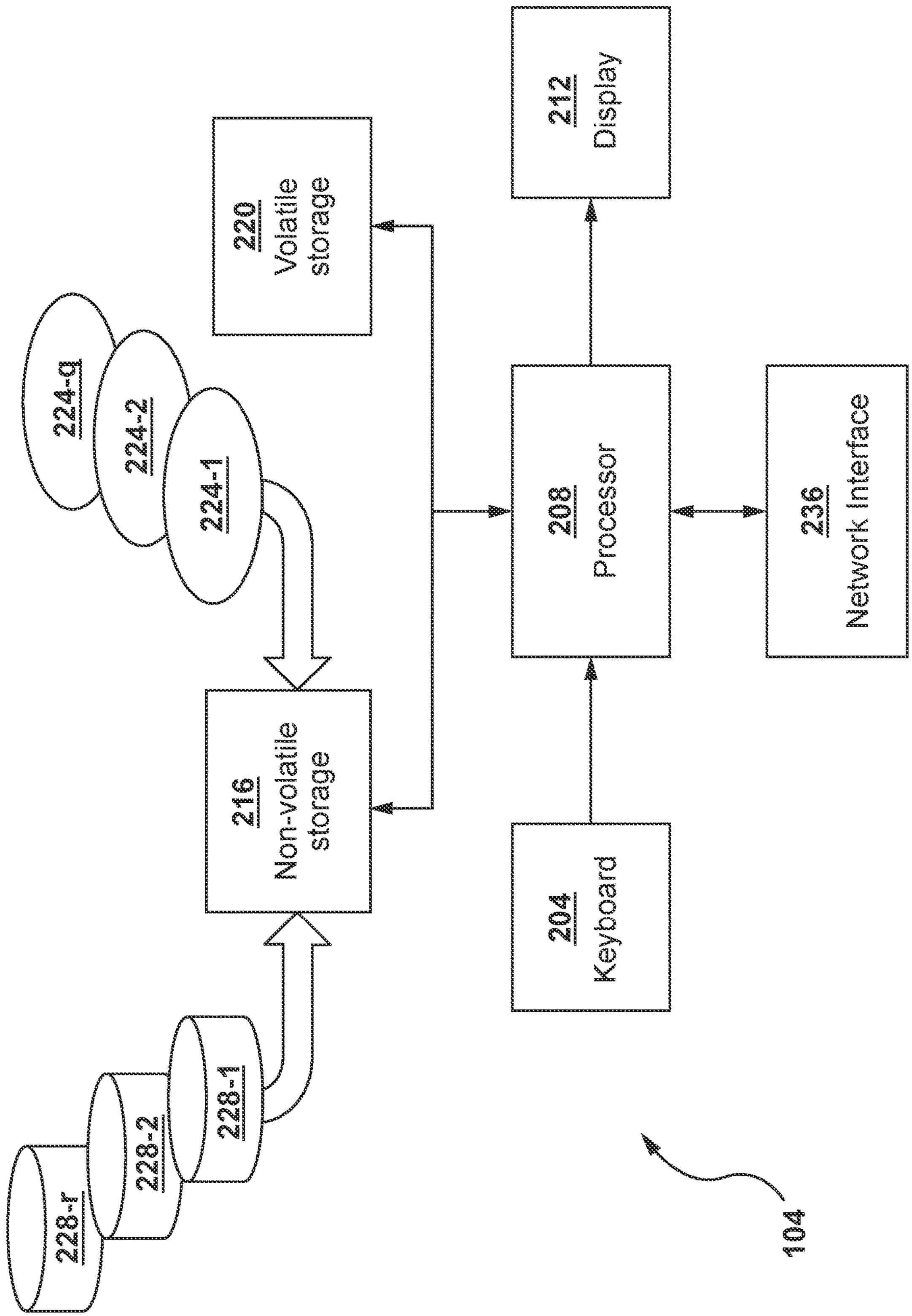
FIG. 2 shows a block diagram of the internal components of the central engine of FIG. 1.

Referring now to FIG. 2, and expanding on certain elements shown in FIG. 1, a non-limiting example of engine 104 is shown in greater detail in the form of a block diagram. While engine 104 is depicted in FIG. 2 as a single component, functionality of engine 104 can be distributed amongst a plurality of components, such as a plurality of servers and/or cloud computing devices, all of which can be housed within one or more data centers. Indeed, the term "server" itself is not intended to be construed in a limiting sense as to the type of computing hardware or platform that may be used.

Engine 104 includes at least one input device which in a present embodiment includes a keyboard 204. (In variants, other input devices are contemplated.) Input from keyboard 204 is received at a processor 208. In variations, processor 208 can be implemented as a plurality of processors. Processor 208 can be configured to execute different programing instructions that can be responsive to the input received via the one or more input devices. To fulfill its programming functions, processor 208 is configured to communicate with at least one non-volatile storage unit 216 (e.g., Erasable Electronic Programmable Read Only Memory ("EEPROM"), Flash Memory, Hard-disk) and at least one volatile storage unit 216 (e.g., random access memory (RAM)). Programming instructions (e.g. applications 224) that implement the functional teachings of engine 104 as described herein are typically maintained, persistently, in non-volatile storage unit 216 and used by processor 208 which makes appropriate utilization of volatile storage 220 during the execution of such programming instructions.

Processor 208 in turn is also configured to control display 212 and any other output devices that may be provided in engine 104, also in accordance with different programming instructions and responsive to different input received from the input devices.

Processor 208 also connects to a network interface 236, for connecting to network 106. Network interface 236 can thus be generalized as a further input/output device that can be utilized by processor 208 to fulfill various programming instructions.

As will become further apparent below, engine 104 can be implemented with different configurations than described, omitting certain input devices, or including extra input devices, and likewise omitting certain output devices or including extra output devices. For example, keyboard 204 and display 212 can be omitted where engine 104 is implemented in a data center, with such devices being implemented via an external terminal or terminal application that connects to engine 104.

In a present embodiment, engine 104 is configured to maintain, within non-volatile storage 216, datasets 228 and applications 224. Datasets 228 and applications 224 can be pre-stored in non-volatile storage 216 or downloaded via network interface 236 and saved on non-volatile storage 216. Processor 208 is configured to execute applications 224, which accesses datasets 228, accessing non-volatile storage 216 and volatile storage 220 as needed. As noted above, and as will be discussed in greater detail below, processor 208, when executing applications 224, controls e-commerce platform 112 and its interactions with devices 108.

Figure 3:
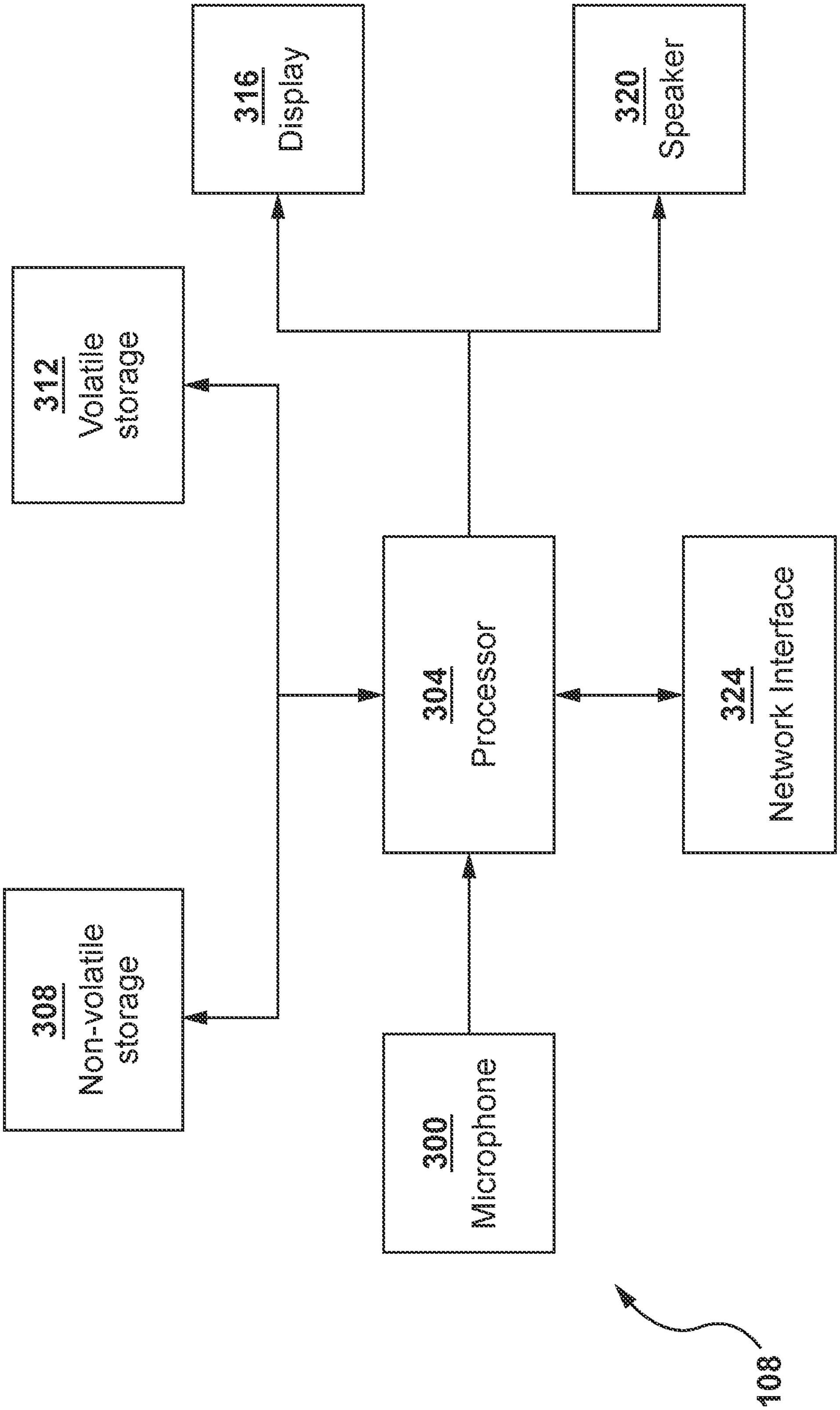
FIG. 3 shows a block diagram of the internal components of a communication device of FIG. 1.

Referring now to FIG. 3, a non-limiting example of device 108 is shown in greater detail in the form of a block diagram. Device 108 includes at least one input device, which in a present embodiment includes microphone 300. As noted above, other input devices that receive sound are contemplated. Input from microphone 300 is received at processor 304. In variations, processor 304 may be implemented as a plurality of processors. Processor 304 can be configured to execute programming instructions that are responsive to the input received via microphone 300, such as sending audio received via microphone 300 to engine 104. To fulfill its functions, processor 304 is also configured to communicate with at least one non-volatile storage 308, (e.g., EEPROM or Flash Memory) and at least one volatile storage 312. Programming instructions that implement the functional teachings of device 108 as described herein are typically maintained, persistently, in non-volatile storage 308 and used by processor 304 which makes appropriate utilization of volatile storage 312 during the execution of such programming instructions.

Processor 304 is also configured to control display 316 and speaker 320 and any other output devices that may be provided in device 108, also in accordance with programming instructions and responsive to different input from the input devices.

Processor 304 also connects to a network interface 324, for connecting to network 106. Network interface 324 can thus be generalized as a further input/output device that can be utilized by processor 304 to fulfill various programming instructions.

As will now be understood, device 108 can be of a variety of form factors including a laptop computer, mobile telephone, table computer, desktop computer or the like. Device 108 can be implemented with different configurations than described, omitting certain input devices, or including extra input devices, and likewise omitting certain output devices or including extra output devices.

Processor 304 is configured to bi-directionally communicate with e-commerce platform 112, via network interface 324 and network 106, accessing non-volatile storage 308 and volatile storage 312 as needed.

Turning now to e-commerce platform 112 and computing engines 116 in FIG. 1, the hardware infrastructure used to implement each can be substantially the same as engine 104, and/or scaled versions thereof. More specifically, engagement engines 116-E can be based on any known or future contemplated content delivery engines or platforms. Modern, well known non-limiting examples include any search, social networking, media platforms offered by the likes of Google™, Facebook™ or any of other well-known content delivery providers and platforms that may be accessed on communication devices 108. For example, engagement engine 116-E-1 can be based on Google search, engagement engine 116-E-2 can be based on Facebook, and engagement engine 116-E-0 can be based on the electronic version of the New York Times. It is also to be understood that the nature of the content can be for drawing new communication devices 108 into engagement with e-commerce platform 112 or for continuing to engage communication devices 108 that have already interacted with platform 112. Thus, the hardware used to implement engagement engines 116-E will now be understood by those of skill in the art. Furthermore, it is contemplated that engine 104 is configured to dynamically add or remove individual engagement engines 116-E, and/or to dynamically adjust utilization of those engagement engines 116-E towards achieving an efficient flow of utilization of computational and bandwidth resources between all engines 116 and communication devices 108. By the same token, fulfilment engines 116-F can be based on any presently known or future contemplated fulfillment platforms such as Amazon™, Wayfair™, Ali-Express™, and/or a purely proprietary platform built manually or using a platform such as Shopify™. For example, fulfillment engine 116-F-1 can be based on Amazon, fulfillment engine 116-F-2 can be based on Wayfair, and fulfillment engine 116-F-p can be based on Ali-Express. Thus it will now be understood that the specific hardware used to implement fulfillment engines 116-F can be based on the hardware from any chosen existing platform or built upon an infrastructure similar to engine 104. The foregoing will now further emphasize how it is generally contemplated that engine 104 is configured to dynamically add or remove individual fulfillment engines 116-F, and/or to dynamically adjust utilization of those fulfillment engines 116-F towards an achieving an efficient flow of utilization of computational and bandwidth resources between engines 116 and communication devices 108.

In a variant, it is to be understood that one or more proprietary engagement engines 116-E and/or one or more proprietary fulfillment engines 116-F can be built directly into engine 104 as a complete embodiment according to the present specification.

Figure 4:
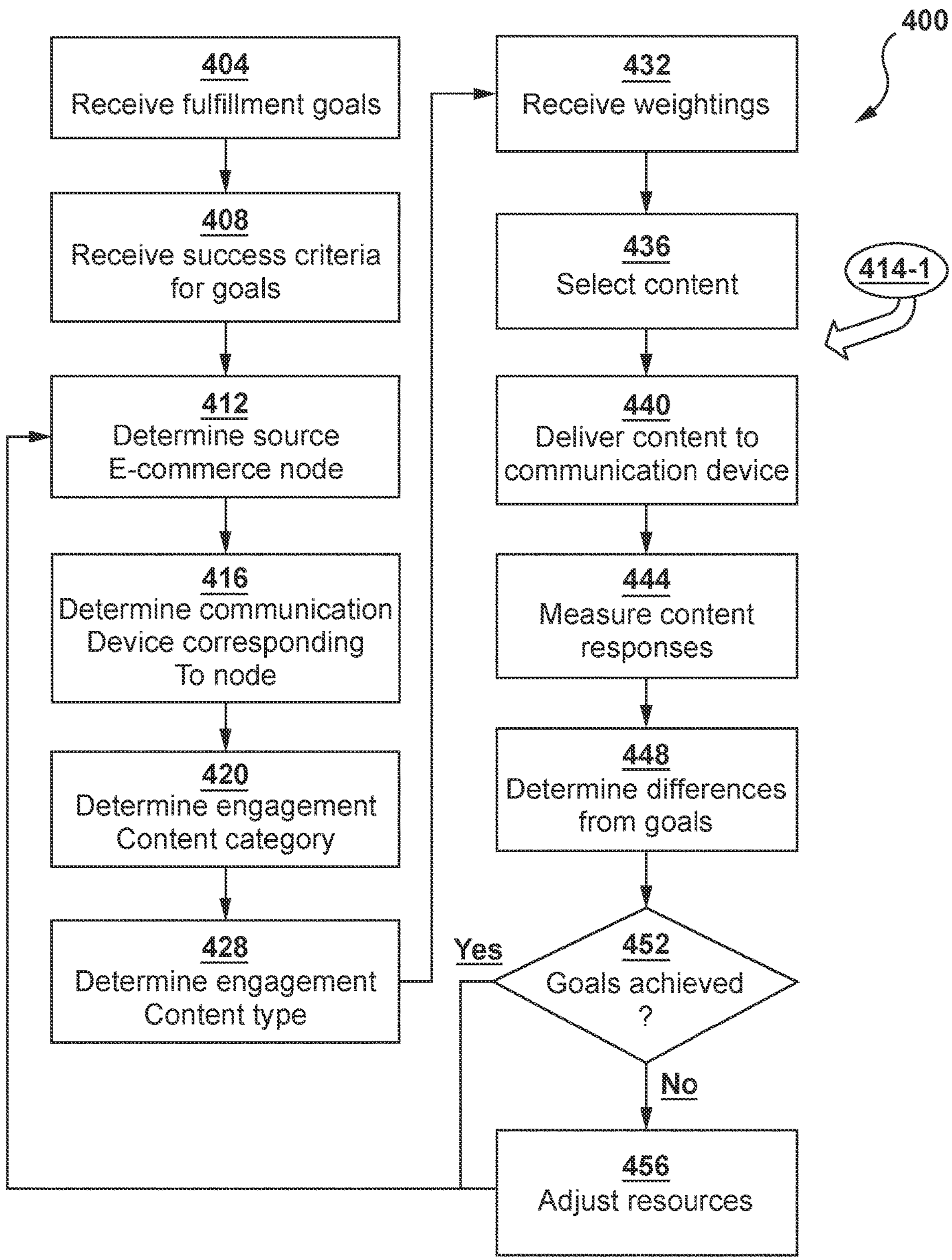
FIG. 4 shows a flowchart depicting a method for dynamic control of an ecommerce platform.

To further assist in understanding system 100, reference will now be made to FIG. 4 which shows a flowchart indicated generally at 400, depicting a method to control e-commerce platform 112 as it interacts with communication devices 108. Hereafter, the flowchart will be referred to as method 400, and this nomenclature will apply to other methods and flowcharts discussed herein. Method 400 can be implemented on system 100, but it is to be understood that method 400 can also be implemented on variations of system 100, and likewise, method 400 itself can be modified and operate on system 100. It is to be understood that the blocks in method 400 need not be performed in the exact sequence shown and that some blocks may execute in parallel with other blocks, and method 400 itself may execute in parallel with other methods. Additional methods discussed herein in relation to system 100 are subject to the same non-limiting interpretation.

Thus, the functionality and programming behind method 400 implements a schema of key performance indicators (KPI). Hereafter a schema may be referred to as a KPI Schema. Block 404 through Block 432 can be implemented in a variety of ways, from hard coding to an elegant graphical interface that expresses requested inputs in terms of known business language such as "Goals", "Critical Success Factors", and "Key Performance Indicators". In a presently preferred embodiment, such a graphical interface utilizes a concept of a Key Performance Indicator Schema or "KPI Schema".

A KPI Schema enables the ability to track business performance by identifying, managing and visualizing important metrics and tracking them against actual performance Many people and processes are involved in delivering on corporate goals. A KPI Schema creates hierarchical structures to describe the logical relationships and the many activities needed to accomplish those goals.

Schemas will be created and edited in a standard browser on a desktop computer. Schemas can then be shared and interacted with on a desktop computer using a browser. Ideally, a mobile app will also be made available, but that is not part of this initial development.

A KPI Schema enables several concepts.

- Collaboration. Assign metrics and targets to individuals or teams and track them against actual results. Track all information and strategy associated with a project and check the status and timeliness of deliverables.
- Visualize decision making Create tree-like visualizations to show the relationships of disparate activities and how they affect overall goals.
- Data import. Include external data via Excel or connect directly to data sources through an API. The import process automates the creation of visual maps to show relationships.
- Security. Settings and audit trails ensure all changes are authorized and tracked.
- Use and Reuse. Increase productivity and improve efficiencies by storing and reusing KPIs, Schemas and Branches of Schemas.
- Attain Goals. Identify and track all activities and actions required to meet corporate, team or individual goals. See how work efforts align with team members and how they affect goals.
- Status updates. A target for each KPI displays its contribution to the overall goal completion and highlights the individual, group and overall project completion status via percentage completions and color-coding.

2. Schema Definitions

- User: Individual signed up for KPI Schema service. Can be either Editor, Viewer or Administrator as described later in this document.
- Schema: A visual representation of the actions and activities that are required to accomplish a specific set goal. Generically, a Schema is considered a mindmap. See example: https://simplemind.eu/how-to-mind-map/reading/
- Canvas: Space provided for creating Schema
- Branch: Layer in Schema. Can have single Node such as a Goal or contain multiple Nodes such as many CSF (Critical Success Factors)

- Node: Specific component on Branch. e.g. each CSF is a Node.
- Measures: Raw numbers such as manufactured parts, number of sales calls or blogs written.
- Metrics: Calculations based on Measures such as: % manufactured parts that failed, number of sales calls done per week, or blogs written per month.
- Sandbox: Temporary storage of incomplete Schemas and branches.
- Inventory: Resource library for all completed assets developed in the system—Schemas, branches, measures and metrics.
- Elements: Any of Inventory, Schemas, Branches, measures and metrics Functionality The system provides the ability for a new user to create an account or login to an existing one via a secure, password-protected sign-in process. Users can then build interactive hierarchical Schemas to illustrate what metrics are being tracked. Schemas and Branches can be saved, reused, and shared with others.

The interface of KPI Schema supports several modern browsers such: Chrome, Safari, Edge and Firefox.

User Interactions

There can, in certain embodiments, be two types of users of system 100.

- Editors—can create and make changes to Schema and KPI Measures and Metrics. They can edit their performance numbers and limit who else can make such changes.
- Viewers—can only view a Schema but not make any changes to the structure. They can edit their performance numbers.

Creating a Schema

Figure 5:
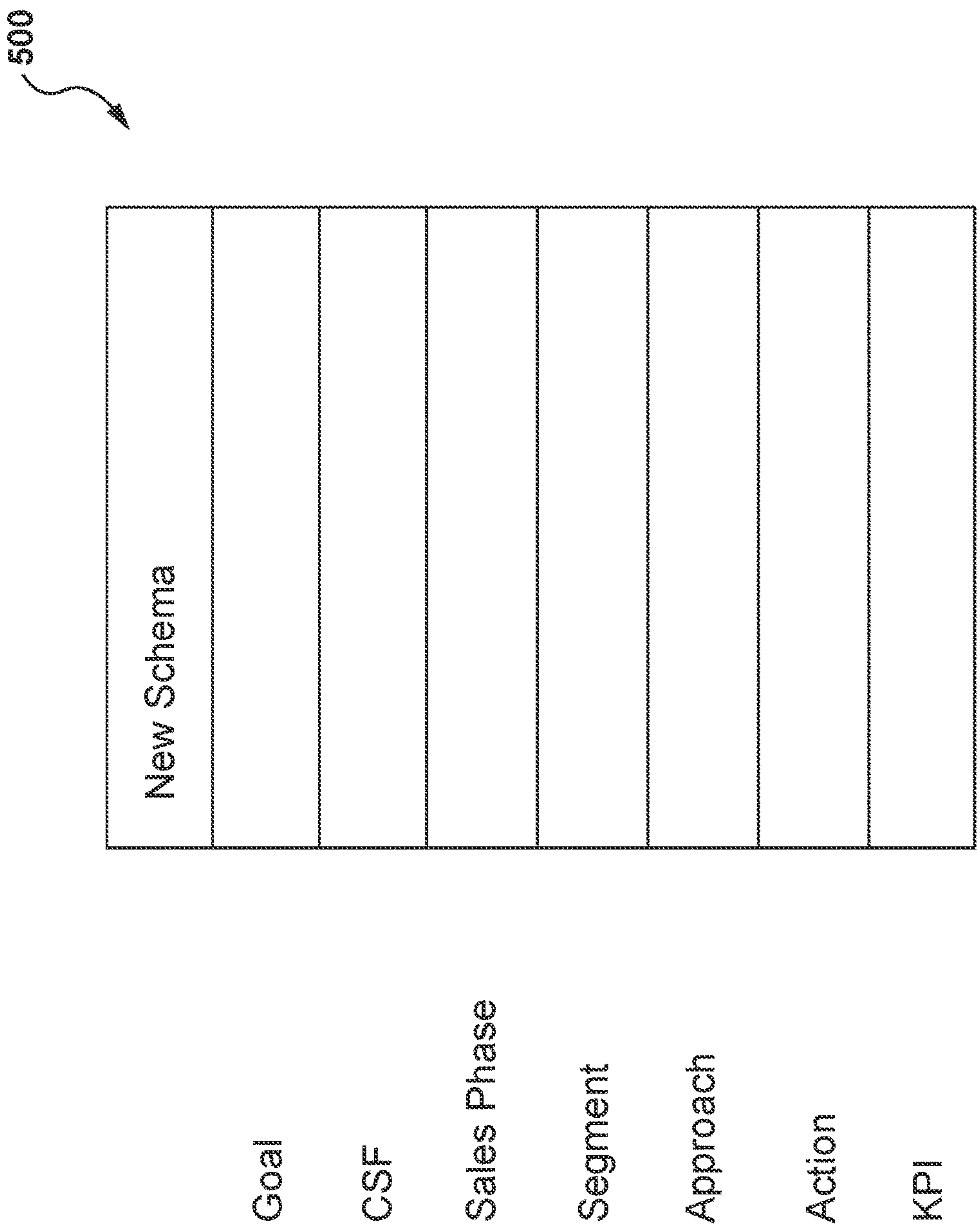
FIG. 5 shows a schema for a graphical interface that can be used to provide control instructions to the central engine.

At the start of any session, user will be asked "what would you like to do?" and presented with 2 options:

1. Open existing Schema. If clicked, will be presented with list of current Schemas, each of which can be opened and edited in Canvas
2. Create New Schema from scratch. If this is chosen, they will be presented with incomplete Schema with the seven components or field levels listed in FIG. 5 indicated generally at 500. Note that the number of layers and labelling of each layer in the Schema 500 is variable.

User will first be asked to name the Schema. By default, New Schema will be in Name field, such as below.

Name: New Schema
Goal:
Critical Success Factor: (CSF)
Sales Phase:
Segment:
Approach:
Action:
KPI:

The user begins by identifying the Goal and then CSF (Critical Success Factors) and moves down the vertical tree but they can also start with a known KPI if they already have them identified. They can fill in the missing pieces as they decide on them. The Schema structure will help them justify the chosen KPIs.

At each field level, the system 100 can prompt user to create a new Node, such as a CSF. Once done, they will be asked if they want to create another Node of the same type (i.e. another CSF) or if they want to continue to next phase. In this case the Sales Phase. The user also has the option of creating new and additional layers as they require.

The Schema can be saved and shared at any time. i.e. it does not have to be complete with all levels completed.

A sandbox is available as a bin of "stuff to possibly use" off to the side of the Schema. The user can enter things there as a "card" or something then drag them into the Schema when they figure out where they go. Likewise, if they're reviewing an existing Schema and feel an entry isn't quite right, they can drag it to the sandbox to put it on hold until they figure out where it really belongs. The sandbox should be saved between sessions so people can pick up where they left.

Note: D3.js is a JavaScript library for producing dynamic, interactive data visualizations in web browsers. In the first development effort, it was used as the interface and creation of Schemas. It makes use of Scalable Vector Graphics, HTML5, and Cascading Style Sheets standards. It is not a requirement that D3 be used, but it is essential that a JavaScript library be used instead of creating code from scratch.

Branches

Branches are any self-contained sections of the Schema. Information and the intellectual property of the branch can be reused to bring new capabilities or structures into a Schema.

For example, if an organization wants to establish or upgrade their digital marketing capability, they could locate an appropriate branch by browsing the inventory and matching the capability they are looking for. They can then simply drag that branch onto their canvas and attach it wherever appropriate. They could then assign users to each Node.

Inventory

Inventory are areas to store and access Schemas, Branches, measures and metrics. Corporations can use branches as a way of developing and re-using their ideas instead of continually reinventing and recreating the same structures.

Users can create a new branch by adding individual nodes or branches and saving that structure as a new branch.

Figure 6:
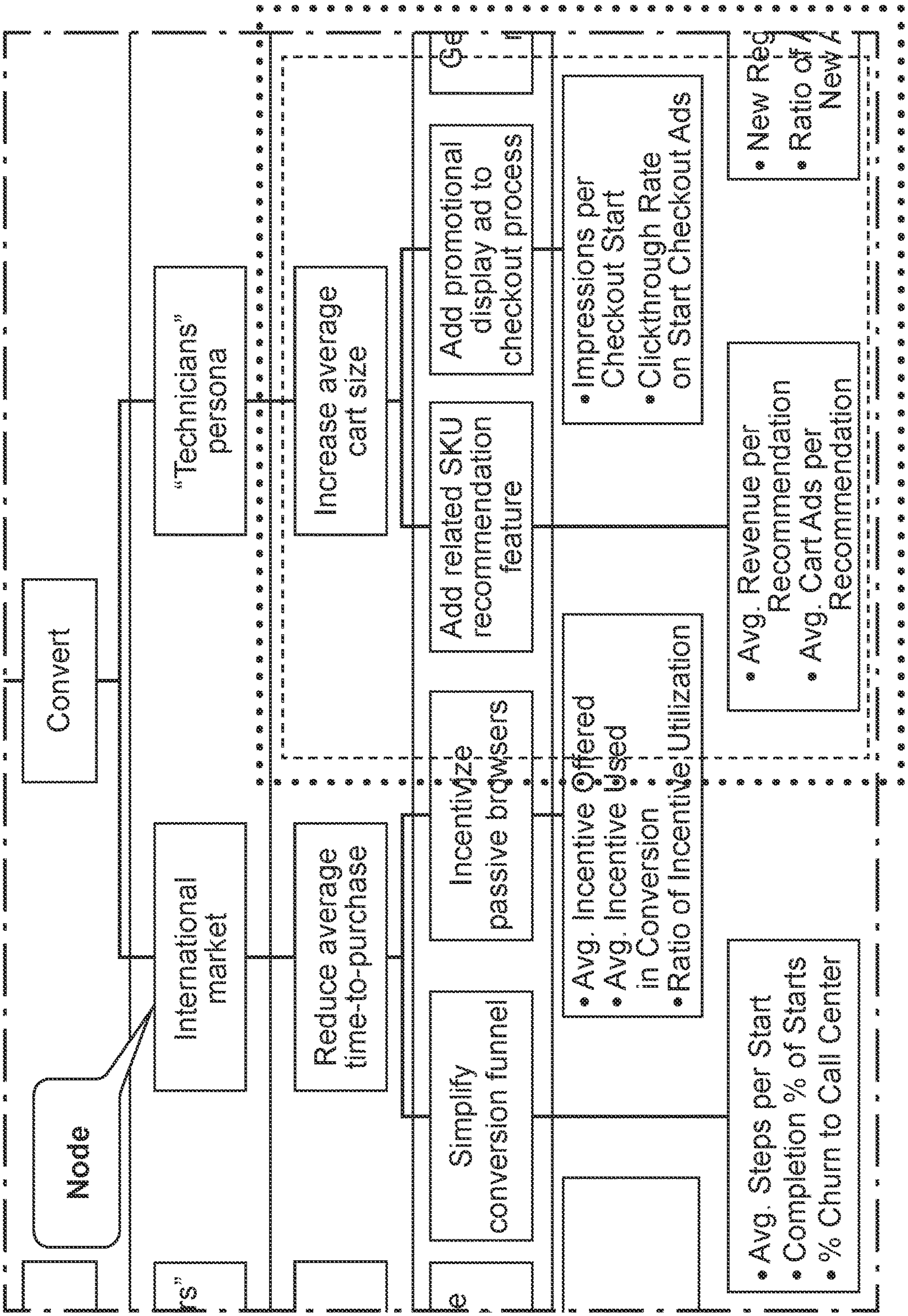
FIG. 6 shows an example of a tree that can be used as part of the graphical interface discussed in FIG. 5.

The image in FIG. 6 highlights:

A "Node" is labeled in a text bubble

A Branch called "Convert" is the entire Figure.

A Branch called "Increase Average Cart Size" in dotted box

Building a New Schema

TABLE I below simulates the interaction between user and the system in the building of a new Schema. The system provides an interactive experience when creating a Schema, by guiding the user through the hierarchical levels.

For example, the user should be told to identify a Goal, and be given a Definition for the Goal and then also Examples as they ask for more information. We have listed initial values for the Definition and Examples, but these must be easily modified by a non-developer on the KPI Schema marketing team. i.e. does not require a Developer. Modifications to these definitions and examples can be modified by Editors of customer and/or by KPI Schema staff. Customers may want to add in their own examples to make it customizable for their company.

TABLE I

| | Definition | Examples |
| --- | --- | --- |
| Goal | Broad desired outcome. It states "what" we want to accomplish but not "how." It states where you are going rather than how you will get there.<br>A goal is a general priority or effort the entire organization, your division, or team has been tasked with achieving over an extended period of time, such as quarters or years. | Decrease Support Services costs<br>Improve customer service<br>Increase Revenue |
| Critical Success Factor | These are strategic conditions that are vital to achieve your Goal. They have a tremendous impact on how successfully and effectively an organization meets its stated goals. | Decrease Call Center calls<br>Decrease Support Services costs<br>Launch new product<br>Open new office<br>Hire sales person or team |
| Sales Phase | Nearly all marketing and sales activities fall into one of four different periods in the lifecycle of customers. These are generally known as marketing phases. | |
| | Acquire - This is the initial broadcast of your marketing message. The attempt is to get your persuasive, introductory message out to as many of your prospective clients and customers as possible. | Acquire |
| | Engage - Refine the message by delivering a targeted, meaningful, message to the potential customers that attract them to you for more detailed information. | Engage |
| | Convert - Provide enough incentive, and a simplified process, and cause the potential customer to execute your preferred action. | Convert |
| | Retain - Ensure you delivered value as promised and your product/service has long-term value so they keep coming back. | Retain |
| Segment | Identify the targeted audience or function. Segmenting your audience is the practice of dividing potential customers into meaningful subgroups based on their characteristics and preferences.<br>It can be based on existing customers or new, age, gender, location, income, education attained, profession, etc. | Male, 65+ years old, Resides in Florida<br>Engineers, recent graduates, working in health care<br>Female, married, college degree, income for $80K+, Europe |
| Approach | The Approach is a summary of things you will do to accomplish your stated Critical Success Factor. There may be several Approaches for each CSF. | Get clients to convert better on web site<br>Improve web check-out process<br>Create Social media campaigns<br>Initiate contact with new potential clients |
| Action | Activity or business process required to be performed to support stated Approach. This is the actual work we are going to do or the function we are going to measure. | Make customer phone calls<br>Set up new customer meetings<br>Launch new Google Ads campaigns<br>Improve new lead conversions by being more responsive<br>Optimize AdWords campaign by adding new key words<br>Send mailer<br>greet customers at door<br>completed application form-fills<br>loan applications completed |
| Measure | Numbers that measure your Actions. Raw numbers and data points found in reports, in corporate databases, call centers and other data silos. | page views<br>number of visits<br>product sales<br>sales calls<br>defective parts |
| KPI (Key Performance Indicator) | This is (often) a calculated value derived from measures. Should be expressed as Ratio, Average, Percentage or Rate (RAPR). And they should be expressed over time (daily, weekly, monthly, etc.)<br>There are an infinite number of Metrics, but only some are key to informing how your Actions are doing. (i.e. it's just an important metric.) | page views per week<br>ratio of visits registering for an event<br>product sales as compared to previous month<br>customer phone calls made per day<br>Set up new customer meetings per week<br>Track click-through-rate for AdWords per day |
| KPI Target value | These are values you want to achieve and that you have set for your KPIs | Make customer phone calls per day; 10<br>Set up new customer meetings per week; 2<br>Track lead conversion per month; 12<br>Track Click-through-rate for AdWords per day; 2% |

TABLE I-continued

| | Definition | Examples |
|---|---|---|
| Target Type | The Target type is either a raw number as in Measure or calculated value as in Metric | Number of outbound phone calls made each month<br>Number of user sign-ups for a corporate newsletter<br>Web downloads of a financial report<br>Or it can be expressed a calculated Metric such as:<br>Percentage increase in outbound phone calls made month over month<br>Conversion rate of web visitors to signing up for newsletter<br>Ratio of web downloads to offers of a financial report |
| Target Actual | These are values you were able to achieve | 500; page views per week<br>15:1; ratio of visits registering for an event<br>5% increase; product sales as compared to previous month<br>40; customer phone calls made per day<br>3; Set up new customer meetings per week<br>5%; Track click-through-rate for AdWords per day |

Figure 7:
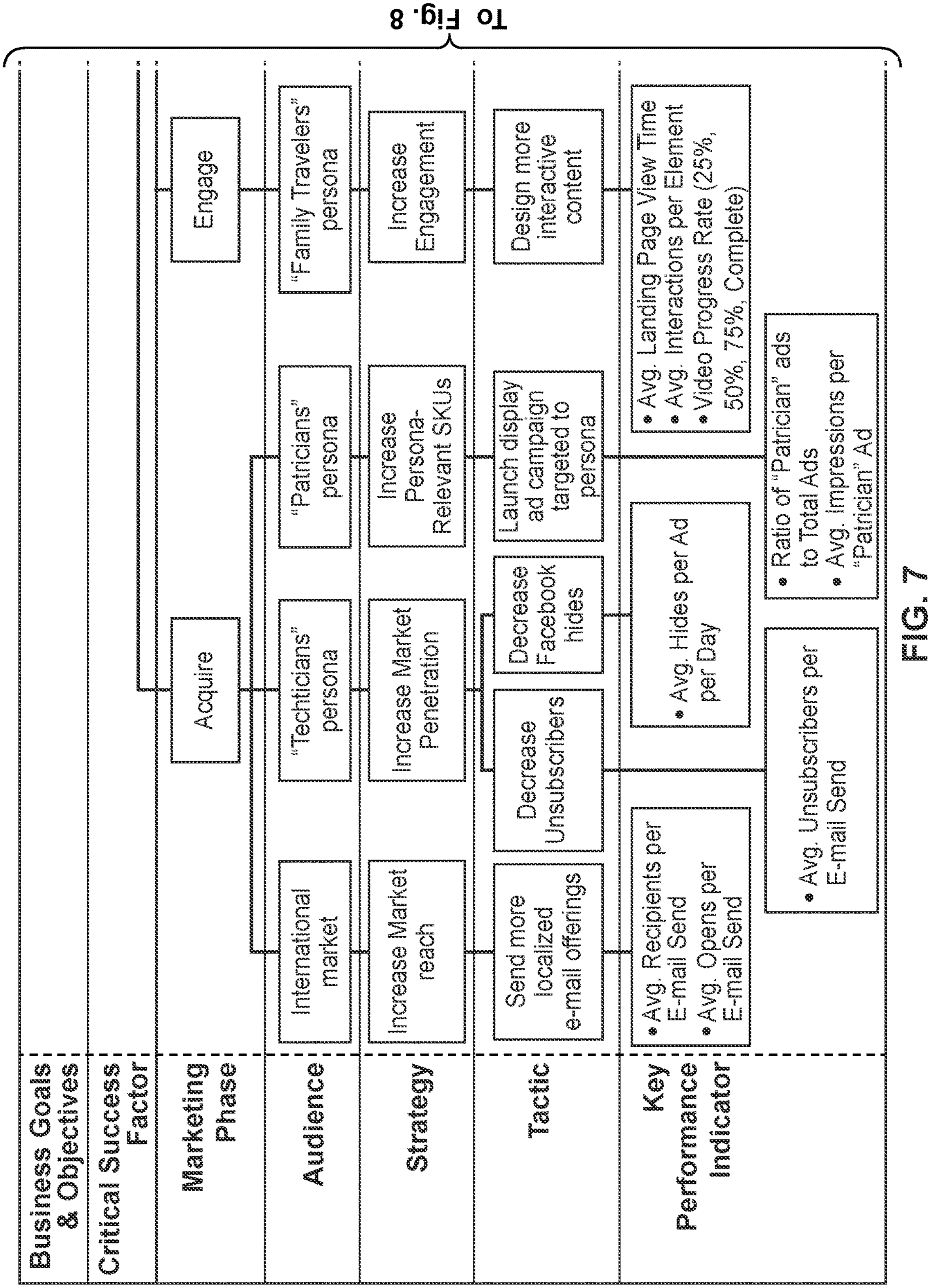
FIG. 7 shows an example of a tree that can be used as part of the graphical interface discussed in FIG. 5.
Figure 8:
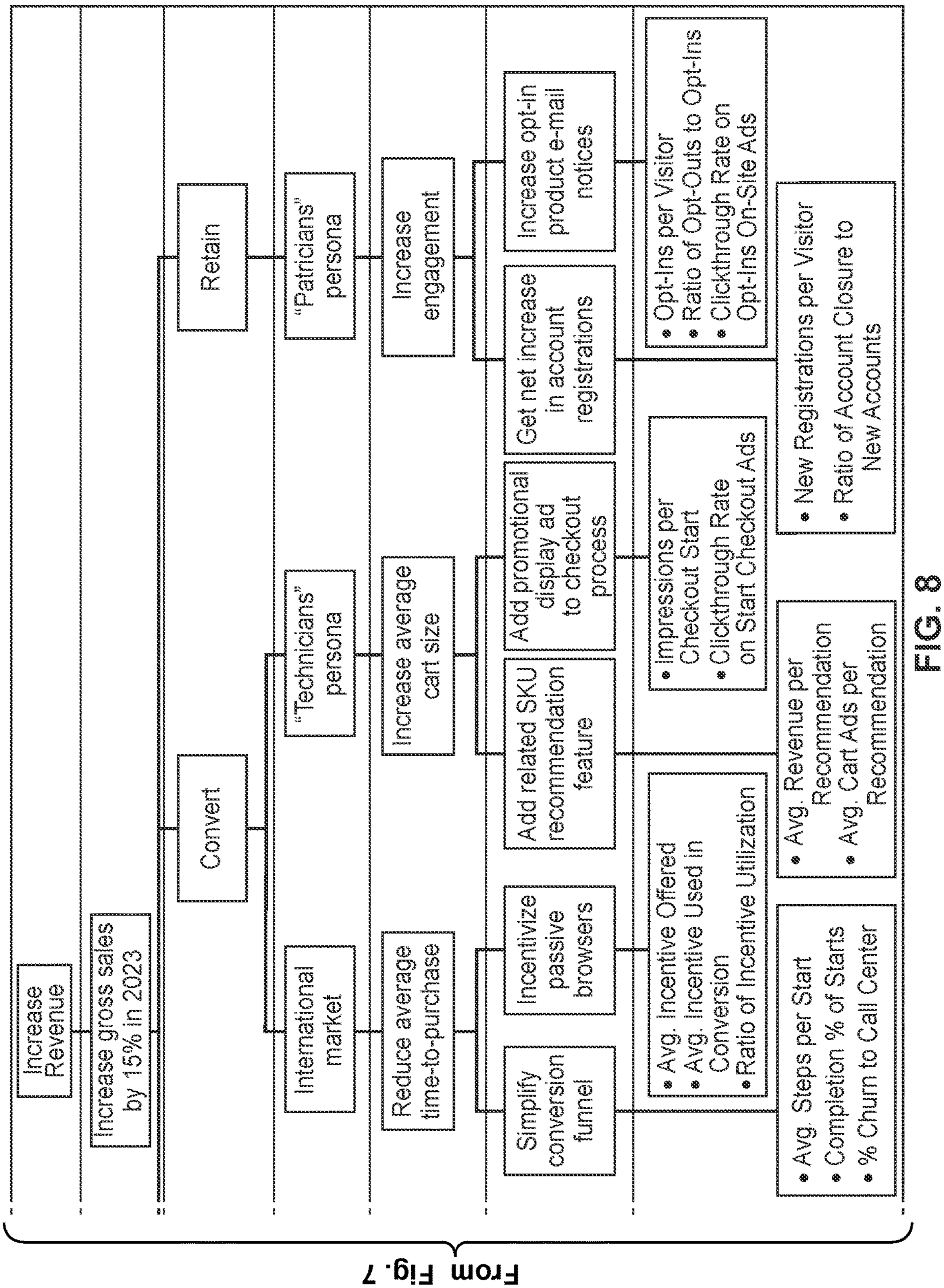
FIG. 8 continues the example in FIG. 7.

FIG. 7 and FIG. 8 show a non-limiting example of a completed Schema. This schema can be generated on display 212 to confirm desired operational parameters of method 400.

Annotations and Tags

Just as users are guided in the creation of Branches and Nodes, they will have the ability to modify, delete and add new annotations which are attached to any Node or Branch. This allows users to share ideas with others or set as reminders for themselves of what was done.

The system needs to support annotations and tags. Users will have the ability to attach to a Node or Branch. This could be a sentence or paragraph to assist in describing something about it.

For tags, a list of accounts will populate when you use the @ tag, and popular hashtags will populate when you use the #tag. When the account or topic appears, the user can select it from a drop-down list.

KPI Input

Identified KPIs can either be a precise Measure or a calculated Metric. Both are acceptable as inputs in the Karta. For example, it can be expressed as a Measure such as:

Number of outbound phone calls

Number of user sign-ups for a corporate newsletter

Web downloads of a financial report

Or it can be expressed a calculated Metric such as:

Percentage increase in outbound phone calls made month over month

Conversion rate of web visitors to signing up for newsletter

Ratio of web downloads to offers of a financial report

Once a user has identified a KPI to track, the users will have the ability to enter a numerical value in an input field for KPI Target. An additional free-form field will allow user to indicate the Relative type of the Target value used. For example, they can state it is a Monthly target, or a percentage increase over last week's target.

An Editor of Schemas will be able to enter the formula behind the metric. And there will be a way of testing the formula and input sample values to make sure they get a value they are expecting. This will require a way to notate "fields" (i.e., measures) that feed the formula. Something like:

"Percentage increase in outbound phone calls from prior month" would be:

(([Number of Outbound Phone Calls]/[Number of Months])−[Previous Month Average Outbound Phone Calls per Month])/[Previous Month Average Outbound Phone Calls per Month]

System needs to show Editor that math formula validates as it is entered. Likely with a green checkmark to indicate it is correct. Guidance needs to be provided to users in the form of help screens.

Input

User will be able to enter how many of each metric they have completed in a set period. For example, if the Target value for a KPI is 10, they can input that they did 8 and the system would calculate that they reached 80% of the objective for that KPI. Users can define values to two decimal points, as a "percentage with two decimal places" a "percentage with zero decimal places" a "whole number (i.e., integer)" a "fractional number (i.e., decimal)".

The user will be able to define what the period is to properly calculate progress. If the goal is 10, the current progress is 8, but you're at 2 days into a one-month period, you're actually way ahead of the goal. Stating an attainment value in terms of year-to-date, or perhaps as progress-to-date is important.

Color coding will show progress. For example, Red might be 50% or less, yellow 51%-99% and 100%+ being green. The thresholds will be user-defined and changeable.

The user will be able to update all fields from an Excel, CSV or other input file.

Figure 9:
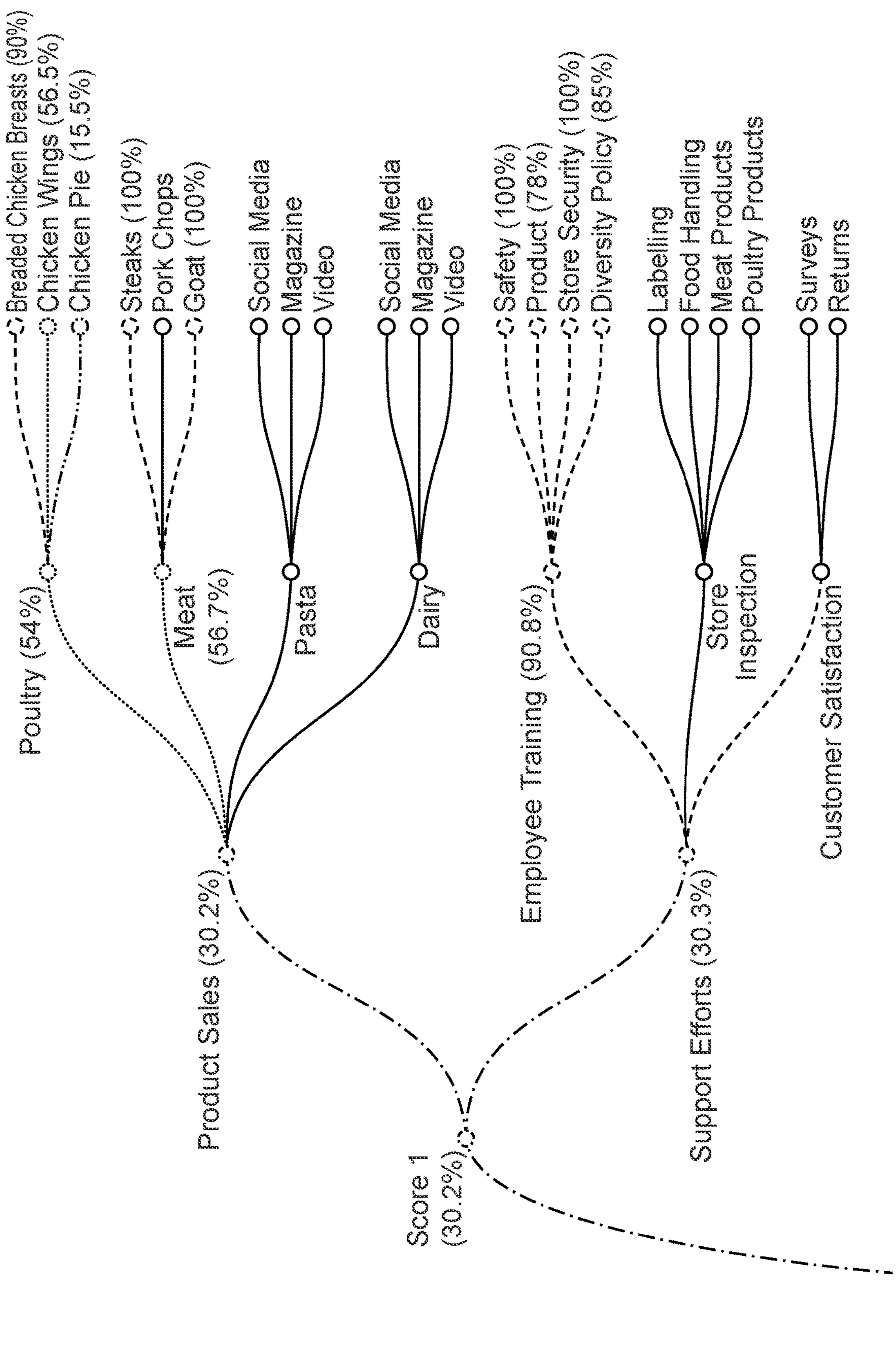
FIG. 9 shows an example of a tree that can be used as part of the graphical interface discussed in FIG. 5.

The example below illustrates how D3 can be used to show attainment of KPI Targets expressed as a percentage. If in this example, Breaded Chicken Breasts had a Target value of 200 and 180 was reached, it will show a 90% completion. Breaded Chicken Breasts, Chicken Wings and Chicken Pie are all part of Poultry, and the average attainment of the group is shown as 54%. (The finished graphical too can have Schemas illustrated top to bottom, or left to right as in FIG. 9.)

Data Export

There should be the facility to export data from the Schema as an Excel file or standard text. The two formats are:

Delimited text files (.txt), in which the TAB character (ASCII character code 009) typically separates each field of text.

Comma separated values text files (.csv), in which the comma character (,) typically separates each field of text.

Weighting

Each branch and each KPI may not be of equal importance. Some activities are more critical to complete. Therefore, users can set weightings on the nodes for branches or KPIs. For example, if 4 nodes are part of one branch, the user will have the ability to say that one is worth 50% because it's more important and the system then assigns 16.7% to the remaining 3. Further, the user can state that a second node is worth 20% and the system will then assign 15% to the remaining 2. This weighting will be inhered up the Schema.

Managing Elements

User can inventory Elements (Inventory, Schemas, Branches, measures and metrics) so they can be accessed, shared, modified and reused. The system will track who made changes, include date and time stamp, and maintain a history of changes.

An Element is owned by one User. Elements can be transferred to another user. This is important because it means if a user opts to delete their account, their Schemas need to be deleted, or transferred. The Elements they own could be transferred to the "account administrator" as a last resort.

Per Table II, Elements can be tagged as Private, Department, Corporate or Public.

TABLE II

| Private | Organization | Public |
|---|---|---|
| Only accessed by Editor | Accessed by users in stated Organization in user profile. Editor sets user permissions to add or edit Measures and Metrics | Available to anyone using KPI Karta. Offers only view capability |

Schemas can be saved with option for "Save As" to duplicate and create new.

Schemas can be sent to others. By identifying an email address to share a Schema with, the system will send a notification and invitation to that new user to access the Schema by signing up for service.

Full security must be in place to ensure authorized user access only.

Multiuser—accommodates multiple user updates and provides real-time views of projects. Users simply refresh their browser to see any updates from other users. This could possibly be done real time and interactively within the interface itself.

Version Control

Version Control, Journaling and Roll Back/undo—permits unlimited rollback from the time a particular goal was last accessed. This journaling functionality allows the user to click and roll back individual actions and then apply those changes individually again by rolling forward. This allows someone to "label" a version and roll back to it if needed. For example, label a Schema as 2.0, then realize it's incorrect and reset the Schema back to the 1.0 version. This would be extremely important for organizations, and likely even useful for individuals.

Branches

It should be possible to save Schema Branches for reuse in another Schema.

This will require that Branch is named and accessible by that author only or by his designated team by same designation; Private, Corporate, Public. Public Branches and Schemas can potentially be available in a Marketplace for others to access.

User Interactions

Security—offers robust security functionality which allows users to protect the security of each part of the system, making it accessible only by selected members or groups.

Multiuser—accommodates multiple user updates and provides real-time views of projects. Users simply refresh their browser to see any updates from other users.

Journaling and Roll Back/undo—permits unlimited rollback from the time a particular Schema was last accessed. This journaling functionality allows the user to click and roll back individual actions and then apply those changes individually again by rolling forward.

Notifications

System will notify users when a Schema they are active with has been updated. An update can be a change to a branch, KPI or target. Notifications can be done via email or some social media method. It should also be possible to send automated reminders for users to complete portions of the Schema such as filling in their performance numbers.

Where Used

Allows a user to see where a Branch has been used in other Schemas.

Allows a user to see where a KPI has been used in other Schemas. If a KPI such as Calls/Month is created, it should be possible to view where that same KPI has been used in other Schemas that are available to user.

Monitoring Performance and Input Screen

All KPI information can be accessed from the Schema map by investigating KPI nodes to see who is working on them and so on.

But users will also have access to a single screen where they can see all KPIs that have been established for themselves as well as for other staff. Here they can see what the KPIs are and their targets and how they are performing against them and what the edit date was for each.

A filter will show only the ones they are responsible for or they can see all. Filtering and sorting will allow the viewing of specific individuals, KPI performance as well as dates of latest updates.

The sharing of numbers by others must be approved by individuals just as Outlook calendars are shared.

This view also acts as the input screen to update their performance values. Changing a value in the input screen will update the value in the Schema.

Reminders will also be available to encourage people to complete their numbers in a timely fashion and to let them know if they are missing their targets.

Schema Marketplace

Users can publish their Schemas in the Public space and offer their consulting services to others.

Thus having completed block 404 through block 432, at block 436 a content selection is made based on the relevant node of the KPI Schema and generated via a selected engagement engine 116-E to an associated one or more communication devices 108 which have been brought into engagement, or are being brought into engagement, with e-commerce platform 112. At block 440 the selected is delivered to the associated communication device 108. At block 444, content responses, according to a relevant branch and/or node, as the context requires are measured, according to the selected weightings of the KPI Schema.

Block 448 comprises determining differences between the measurements at block 444 and the goals and associated KPI metrics found in the relevant schema.

Block 452 determines whether the goals have been achieved. The determination need not be absolute, but rather an approximation or an approaching of the goals may be sufficient to obtain a "yes" determination at block 452. By the same token a "no" determination leads to block 456 at which point the resources allocated to e-commerce platform 112 are adjusted dynamically to attempt another iteration towards fulfillment of the goals from block 404 and the critical success factors of block 408. By removing unproductive engines 116 from platform 112, computing resources and bandwidth across all computing elements of system 100 are preserved, as only engines 116 which lead to maximum communication between communication devices 108 and e-commerce platform 112 are preserved within system 100.

Figure 10:
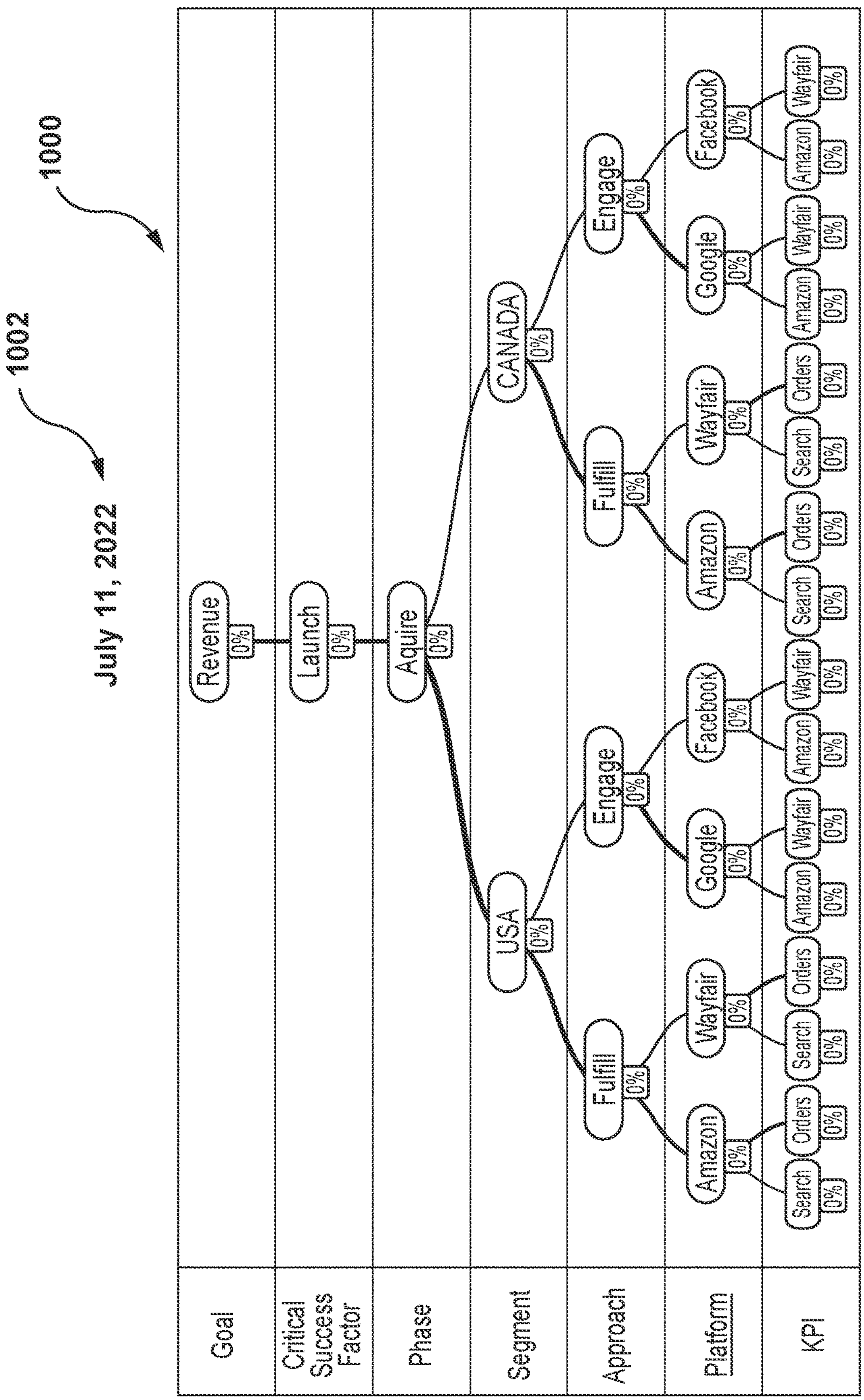
FIG. 10 shows another example of a tree that can be used as part of the graphical interface discussed in FIG. 5.
Figure 11:
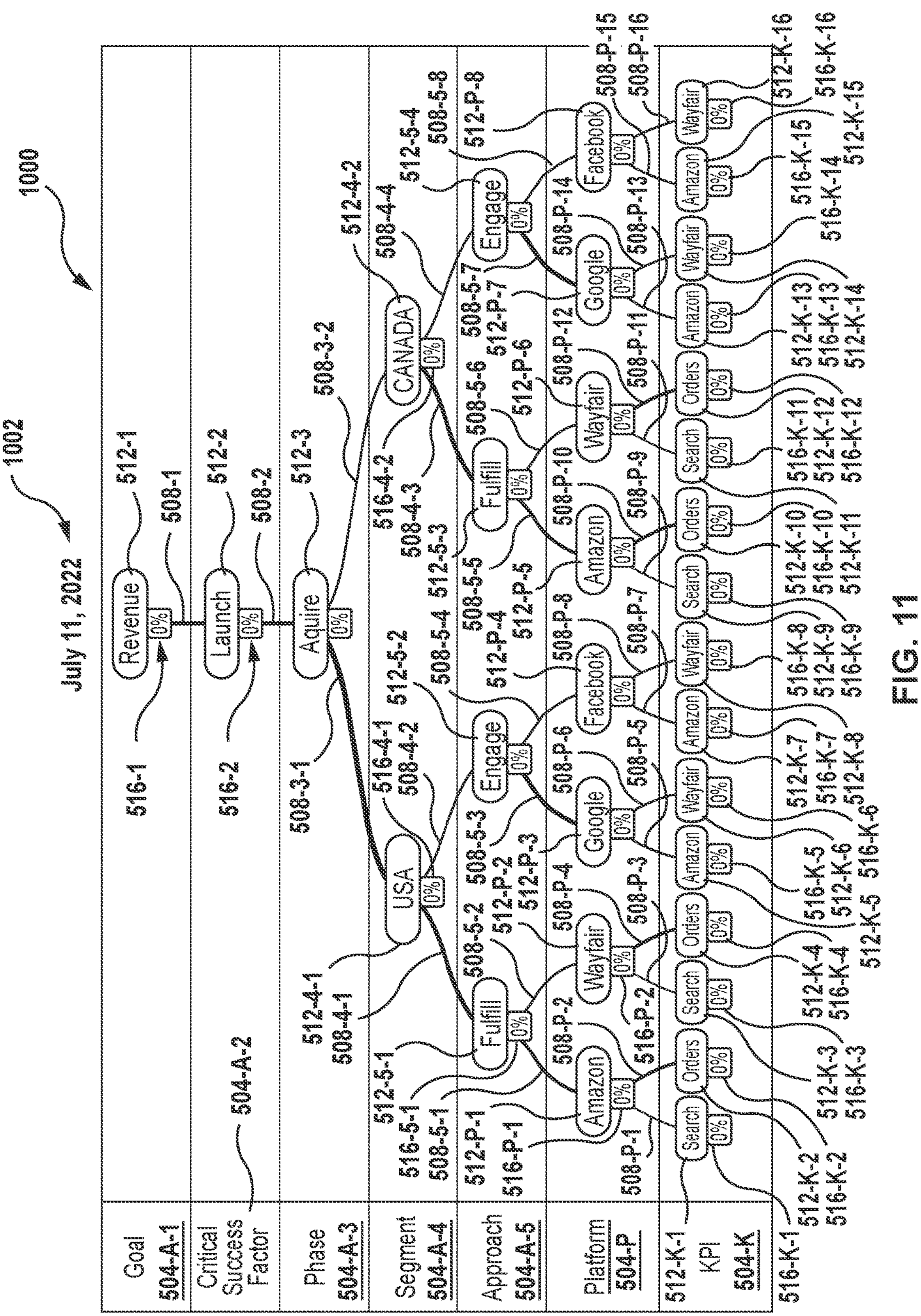
FIG. 11 shows another example of FIG. 10, but including reference characters. Otherwise

Another aspect of this specification provides for generation of a graphical user interface in the form of a dashboard for controlling an e-commerce platform. The generation can be affected by a method and/or stored as a set of programming instructions to implement the method on a computer readable medium. The result of the generation creates a new apparatus for controlling an e-commerce platform. FIG. 10 shows a first example of a dashboard indicated generally 1000. FIG. 11 shows the dashboard 1000 of FIG. 10, but with certain labels. FIG. 10 and FIG. 11 are both provided for ease of reference for the reader. The following paragraphs are thus best understood in reference to FIG. 11, making occasional reference back to FIG. 10 where it is desired to see dashboard 1000 without the clutter of reference characters.

In a present embodiment, dashboard 1000 is generated on display 212 of engine 104 and various portions of dashboard 1000 can be adjusted automatically and/or manually via keyboard 204 (and/or other input device). Dashboard 1000 includes schema 500, or a variant thereon.

In FIG. 11, schema 500 includes five aggregation field levels 504-A. Schema 500 also includes a platform level 504-P and a KPI level 504-K. KPI level 504-K can be used to establish actual performance goals for e-commerce platform 112 in terms of engagements and fulfillments as per interactions with devices 108.

Each aggregation field level 504-A can be configured as described earlier to progressively aggregate KPI information into a single top level 504-A-1, currently defined as a "Goal". Engine 104 can be configured to control various engines 116 to induce interactions with devices 108, iteratively, to thereby affect KPIs at KPI level 504-K to direct the "Goal" towards achievement.

As labelled in FIG. 11, a plurality of edges 508 connect a plurality of nodes 512. (For simplicity, not all edges 508 and nodes 512 will be labelled in other Figures.)

For simplicity of providing an illustrative example, level 504-1, level 504-2 and level 504-3 are logically the same, but a person skilled in the art will appreciate that level 504-2 can have multiple nodes 512 and that level 504-3 can have multiple nodes 512.

Nodes 512-5 all correspond directly to one or more of the engines 116. To elaborate, node 512-5-3 and node 512-5-7 are each labelled "Google" making them correspond directly with our earlier example of Google being engagement engine 116-E-1. Furthermore, node 512-5-4 and node 512-5-8 are each labelled "Facebook" making them correspond directly with our earlier example of Facebook being engagement engine 116-E-2. By the same token, node 512-5-1 and node 512-5-5 are each labelled "Amazon" making them correspond directly with our earlier example of Amazon being fulfillment engine 116-F-1. Furthermore, node 512-5-2 and node 512-5-6 are each labelled "Wayfair" making them correspond directly with our earlier example of Wayfair being fulfilment engine 116-F-2. While not shown, additional engines 116 can be included on dashboard 1000, with the corresponding feedback and control that is discussed further herein. (Dashboard 1000 is therefore also compatible with different e-commerce platforms 112.)

A plurality of fulfillment indicators 516 are also provided, with one indicator 516 being respective to a given node 512. (In FIG. 11, only a few indicators 516 are expressly labelled, such as indicator 516-1 and indicator 516-2 and indicators 516-K, but by following the reference-character nomenclature used herein, specific indicators 516 may expressly labelled according to the narrative context.) In this example, indicators 516 are expressed as a percentage.

Through another interface, not shown, such as a dialogue box activated by using a pointing device to highlight the indicator 516-K or the node 512-K, the numerator and denominator of the fulfillment indicators 516-K can be established. Likewise, if desired, a time period over which such numerators and denominators can be defined, the completion of such a time period (e.g. weekly, monthly, quarterly, yearly) defining when indicators 516 are updated. The denominator of indicators 516-K represent a KPI target, while the numerators represent an actual fulfillment of that target over the relevant time period. In a present embodiment, such numerators and denominators are only provided for indicators 516-K, those indicators 516-K representing what performance is being measured.

Thus, the indicators 516 respective to each node 512—in the field level 504-P and up through field level 504-A to field level 504-1 represent progressive aggregations of the indicators 516-K all the way up to field level 504-1 and ultimately to indicator 516-1 of node 512-1. To elaborate through example, indicator 516-P-1 combines the values of indicator 516-K-1 and indicator 516-K-2. Indicator 516-5-1, likewise, combines the values of indicator 516-P-1 and indicator 516-P-2. And so on.

In some embodiments, the combination of a given parent node 512 is an average of the values in the indicators 516 in the child nodes 512 directly below the given parent node 512. In a presently preferred embodiment, however, each edge 508 can be assigned a relative weighting as compared to another edge 508 depending from the same parent node 512. This relative weighting can be assigned through another dialogue box (not shown) that can be accessed by selecting the relevant edge 508 or node 512 depending from the edge 508. According to this preferred embodiment, edges 508 can be shown also with a relative thickness proportional to their weighting. As a specific example, edge 508-3-1 is much thicker than edge 508-3-2. According to this example, node 512-4-1 has a weighting of 90%, whereas node 512-4-2 has a weighting of ten percent (10%). This means that in indicator 512-3, the calculated value will be based on 90 percent of the value of indicator 516-4-1 and 10 percent of the value of indicator 516-4-2.

While the foregoing has discussed certain specific embodiments, it is to be understood that variants, combinations and/or subsets of those embodiments are contemplated. For example, the foregoing can be applied to KPI systems across a variety of domains including human resources, to track and set targets for KPIs such as Attendance vs combatting absenteeism, rates of alcoholism, number of recruiting referrals. Another domain includes with KPIS such as shipping times, shipping cost per tonnage. Another domain includes civil engineering projects with KPS such as material delivery times, adherence to scheduling, quality control verification. Another domain includes manufacturing, with KPIs such as defects per unit, number of units produced over a given time period, and labor costs per unit manufactured. In some aspects of this specification, some domains can be fully automated using system 100, while other aspects can benefit from the graphical interface embodiments.

At this point it bears repeating that dashboard 1000 is implemented on central engine 104 to establish certain control parameters over e-commerce platform 112. Dashboard 1000 provides a convenient means to set up a holistic campaign to, for example, sell a product on fulfillment engines 116-F using engagement engines 116-E to generate content on devices 108 that will divert traffic on network 106 from device 108 to fulfillment engines 116-F so that interactions can be made between devices 108 and fulfilment engines 116-F to effect an electronic purchase transaction of the product.

According to the example in FIG. 10 and FIG. 11, the dashboard 1000 includes a goal (at field level 504-A-1) of driving revenue for the product. A critical success factor (at field level 504-A-2) for achieving the goal is the launch of the product. A phase (at field level 504-A-3) is to acquire new customers and sales. The meaning of these terms ("Revenue"; "Launch"; "Acquire") are deliberately in the language of users such as sales professionals and/or business analysists and/or product managers, and are thus configurable by those users. (Hereafter these users will be referred to sales professionals). The meaning of these terms is agnostic to engine 104, and accordingly, an advantage of the present specification is the limited technical understanding of system 100 that is required for a sales professional to manage complex campaigns across all of the engines 116 in platform 112.

The language used to identify each node 512 throughout the remaining field levels 504 of dashboard 1000 is similarly "user-friendly", expressed in language familiar to sales professionals without requiring the sales professional to have deep technical knowledge of system 100. Accordingly, dashboard 1000 also includes a Segment (at field level 504-A-4), which defines two markets, namely, the USA (at node 512-4-1) and Canada (at node 512-4-2). (The sales professional may also choose to label field level 504-A-3 as "Country" or "Market" instead of "Segment"; again it is entirely within the control of the sales professional to configure the wording of each field level 504 and node 512 and weightings of each edge 508 as they see fit to conform with their conceptualization of the product sales process.) As noted above, edge 508-3-1 respective to USA node 512-4-1 is weighted at 90%, whereas edge 508-3-2 respective the Canada node 512-4-2 is weighted at 10%, to reflect the relative size of each market. In other words, behaviours of nodes below node 512-4-2 will have only 10% impact on the value of the indicator 516-1 for goal node 512-1 since the Canadian market is only 1/10 the size of the US market.

Continuing down the branches from "Segment" field level 504-A-4, the "Approach" field level 504-A-5 includes a "Fulfill" node 512-5-1 and an "Engage" node 512-5-1 under the "USA" node 512-4-1; likewise, the "Approach" field level 504-A-5 includes a "Fulfill" node 512-5-3 and an "Engage" node 512-5-4 under the "Canada" node 512-4-2. Fulfill represents the sales of the product, and hence edge 508-4-1 and edge 508-4-3 each have ninety percent weightings compared to Engage which represents advertising or promotion of product, and hence edge 508-4-2 and edge 508-4-4 each have ten percent weightings. (The increased weighting due to the fact that, from the perspective of the sales professional, an actual sale or "Fulfillment" drives the "Revenue" goal at node 512-1 more than the promotion or "Engagement", and yet promotion is important to drive sales.)

The label "Fulfill" is thus chosen by the user of dashboard 1000, to mean fulfilments of sales. Again, the label "Fulfill" could be any equivalent that is friendly to the user, such as "Sales" or "Conversions"; it is friendly to the user and otherwise agnostic to the technical functioning of engine 104. Nonetheless, it can be reiterated that such user friendliness reduces the time to, and improves the accuracy of, the configuration of system 100; without such user friendliness in dashboard 1000, communications between devices 108 and platform 112 may include more wasted generations of promotions on devices 108 from engagement engines 116-E that do not lead to actual diversions to fulfillment engines 116-F. This in turn leads to wastage of resources on network 106 and platform 112 and devices 108. System 100 mitigates such wastage.

Continuing down the branches of dashboard 1000 from "Approach" field level 504-A-5, the "Platform" field level 504-P includes an "Amazon" node 512-P-1 and a "Wayfair" node 512-P-2 under the "Fulfill" node 512-5-1; likewise, the "Platform" field level 504-P includes a "Google" node 512-P-3 and a "Facebook" node 512-P-4 under the "Engage" node 512-5-1. (All of which are under "USA" node 512-4-1.) By the same token, the "Platform" field level 504-P includes an "Amazon" node 512-P-5 and a "Wayfair" node 512-P-6 under the "Fulfill" node 512-5-3; likewise, the "Platform" field level 504-P includes a "Google" node 512-P-7 and a "Facebook" node 512-P-8 under the "Engage" node 512-5-4. (All of which are under "Canada" node 512-4-2.)

As will now be understood from the earlier discussions, edges 508-5, respective to nodes 512-P, can be assigned any desired relative weightings according to the respective value of each engine 116 according to the sales professional operating dashboard 1000.

Continuing down the branches of dashboard 1000 from "Platform" field level 504-P, the "KPI" field level 504-K includes a "Search" node 512-K-1 and an "Orders" node 512-K-2 under the "Amazon" node 512-P-1; likewise "KPI" field level 504-K includes a "Search" node 512-K-3 and an "Orders" node 512-K-4 under the "Wayfair" node 512-P-2. (All of which are under "Fulfill" node 512-5-1.) By the same token, the "KPI" field level 504-K includes an "Amazon" node 512-K-5 and a "Wayfair" node 512-K-6 under the "Google" node 512-P-3; likewise "KPI" field level 504-K includes a "Amazon" node 512-K-7 and an "Wayfair" node 512-K-8 under the "Facebook" node 512-P-4. (All of which are under "Engage" node 512-5-2.)

Note that node 512-K-1, node 512-K-2, node 512-K-3 . . . node 512-K-8 are all under the "USA" node 512-4-1, and that a sales professional user of dashboard 1000 can readily visualize that fact due to the graphical layout of dashboard 1000. By the same token, node 512-K-9, node 512-K-10, node 512-K-11 . . . node 512-K-16 are under the "Canada" node 512-4-2, but are otherwise have a common name and function to their respective node 512-K-1, node 512-K-2, node 512-K-3 . . . node 512-K-8. Accordingly, a user of dashboard 1000 can readily visualize the relative performance of each KPI node 512-K in relation to the nodes 512 as they move up the hierarchy of field levels 504.

In an embodiment of the invention, the data in nodes 512-K can be populated, automatically, via one or more application programming interfaces ("API") from central engine 104 to the reporting tools available in engines 116-E and engines 116-F. To elaborate:

- the number of "searches" by US customers using respective devices 108 for the product on the Amazon website as provided by the reporting tool of "Amazon" engine 116-F-1 for an account associated with central engine 104, can be used to directly populate the data within "Search" node 512-K-1.
- the number of "orders" by US customers using respective devices 108 for the product on the Amazon website as provided by the reporting tool of "Amazon" engine 116-F-1 for an account associated with central engine 104, can be used to directly populate the data within "Orders" node 512-K-2.
- the number of "searches" by US customers using respective devices 108 for the product on the Wayfair website as provided by the reporting tool of "Wayfair" engine 116-F-2 for an account associated with central engine 104, can be used to directly populate the data within "Search" node 512-K-3.
- the number of "orders" by US customers using respective devices 108 for the product on the Wayfair website as provided by the reporting tool of "Wayfair" engine 116-F-2 for an account associated with central engine 104, can be used to directly populate the data within "Orders" node 512-K-4.
- the number of advertisements that direct US customers to "Amazon" fulfillment engine 116-F-1 using respective devices 108 for the product on the Google Ads platform as provided by the reporting tool of "Google" engagement engine 116-E-1 for an account associated with central engine 104, that direct customers can be used to directly populate the data within "Amazon" node 512-K-5.
- the number of advertisements that direct US customers to "Wayfair" fulfillment engine 116-F-2 using respective devices 108 for the product on the Google Ads platform as provided by the reporting tool of "Google" engagement engine 116-E-1 for an account associated with central engine 104, that direct customers can be used to directly populate the data within "Wayfair" node 512-K-6.
- the number of advertisements that direct US customers to "Amazon" fulfillment engine 116-F-1 using respective devices 108 for the product on the Facebook Ads platform as provided by the reporting tool of "Facebook" engagement engine 116-E-2 for an account associated with central engine 104, that direct customers can be used to directly populate the data within "Amazon" node 512-K-7.
- the number of advertisements that direct US customers to "Wayfair" fulfillment engine 116-F-2 using respective devices 108 for the product on the Facebook Ads platform as provided by the reporting tool of "Facebook" engagement engine 116-E-2 for an account associated with central engine 104, that direct customers can be used to directly populate the data within "Wayfair" node 512-K-8.
- the number of "searches" by Canadian customers using respective devices 108 for the product on the Amazon website as provided by the reporting tool of "Amazon" engine 116-F-1 for an account associated with central engine 104, can be used to directly populate the data within "Search" node 512-K-9.
- the number of "orders" by Canadian customers using respective devices 108 for the product on the Amazon website as provided by the reporting tool of "Amazon" engine 116-F-1 for an account associated with central engine 104, can be used to directly populate the data within "Orders" node 512-K-10.
- the number of "searches" by Canadian customers using respective devices 108 for the product on the Wayfair website as provided by the reporting tool of "Wayfair" engine 116-F-2 for an account associated with central engine 104, can be used to directly populate the data within "Search" node 512-K-11.
- the number of "orders" by Canadian customers using respective devices 108 for the product on the Wayfair website as provided by the reporting tool of "Wayfair" engine 116-F-2 for an account associated with central engine 104, can be used to directly populate the data within "Orders" node 512-K-12.
- the number of advertisements that direct Canadian customers to "Amazon" fulfillment engine 116-F-1 using respective devices 108 for the product on the Google Ads platform as provided by the reporting tool of "Google" engagement engine 116-E-1 for an account associated with central engine 104, that direct customers can be used to directly populate the data within "Amazon" node 512-K-13.
- the number of advertisements that direct Canadian customers to "Wayfair" fulfillment engine 116-F-2 using respective devices 108 for the product on the Google Ads platform as provided by the reporting tool of "Google" engagement engine 116-E-1 for an account associated with central engine 104, that direct customers can be used to directly populate the data within "Wayfair" node 512-K-14.
- the number of advertisements that direct Canadian customers to "Amazon" fulfillment engine 116-F-1 using respective devices 108 for the product on the Facebook Ads platform as provided by the reporting tool of "Facebook" engagement engine 116-E-2 for an account associated with central engine 104, that direct customers can be used to directly populate the data within "Amazon" node 512-K-15.
- the number of advertisements that direct Canadian customers to "Wayfair" fulfillment engine 116-F-2 using respective devices 108 for the product on the Facebook Ads platform as provided by the reporting tool of "Facebook" engagement engine 116-E-2 for an account associated with central engine 104, that direct customers can be used to directly populate the data within "Wayfair" node 512-K-16.

A person of skill in the art will now appreciate that the user sales professional of dashboard 1000 can, through other interfaces on central engine 104, or elsewhere, define and directly control the creation and online advertising or other promotional campaigns on engagement engines 116-E for the product in question. For example, search engine optimization ("SEO") techniques can be employed to cause the product to appear in organic searches on Google (engine 116-E-1) or to appear in organic social media content on Facebook (engine 116-E-2). Carefully crafted blog posts, videos, or other content that feature the product can cause the product to appear in organic searches on Google on devices 108. Or, social media promoters on Facebook can be engaged to promote organic content related to the product can be effected on Facebook as accessed by device 108. Instead of organic searches, Google Ads or Facebook Ads can be directly employed, to push advertising content of the product directly onto devices 108. Engagement content on engagement engines 116-E can in turn cause users (if deemed relevant by those users) of devices 108 to connect directly to the Amazon fulfillment engine 116-F-1 or Wayfair fulfillment engine 116-2. Thus, KPIs respective to node 512-K-5, node 512-K-6, node 512-K-7, node 512-K-8, node 512-K-13, node 512-K-14, node 512-K-15, and, node 512-K-16 can be impacted through the control of such campaigns, according to the responses by users of device 108 receiving those campaigns. Additional KPI nodes 512-K could be included in dashboard 1000, that include organic searches vs advertisements for each of Google and Facebook, to provide further granularity in dashboard 1000 and the resulting automated control over platform 112, as desired. Still further KPI nodes 512-K can be included for impressions vs clicks under each of those organic campaigns vs advertising campaigns. For simplicity of illustration, however, dashboard 1000 only includes the nodes 512 as shown.

While dashboard 1000 can effect direct control over content campaigns delivered via engagement engines 116-E, it is the actions of users of devices 108 in relation to fulfillment engine 116-F that drive KPI performance of fulfillment nodes 512 including node 512-K-1, node 512-K-2, node 512-K-3, node 512-K-4, node 512-K-9, node 512-K-10, node 512-K-11, and, node 512-K-12. Orders received and tracked via node 512-K-2, node 512-K-4, node 512-K-10, and, node 512-K-12 are of particular interest in efforts to drive indicator 516-1 towards one-hundred-percent, and higher, if possible. Dashboard 1000 thus provides the options for manual and fully automated control over delivery of campaigns via engagement engines 116-E to increase and ideally maximize orders received via fulfillment engines 116-F. In this fashion, campaigns that do not translate into orders received via fulfillment engines 116-F can be removed from engagement engines 116-E, thereby eliminating those engagement engines 116-E from system 100, thereby relieving computational and network resource strain on engagement engines 116-E, devices 108 and network 106.

It can also be noted that dashboard 1000 includes a date field 1002, which indicates that state of dashboard 1000 given the state of various KPI nodes 516-K on that day. In FIG. 10 and FIG. 11, the date is Jul. 11, 2002. In subsequent Figures, the date will change along with the state of the indicators 516-K and the effect those states have on indicators 516 at every field level 504 above KPE field level 504-K. The date field 1002 can be configured for other periods of time, such as weekly, monthly, quarterly or yearly as desired.

Figure 12:
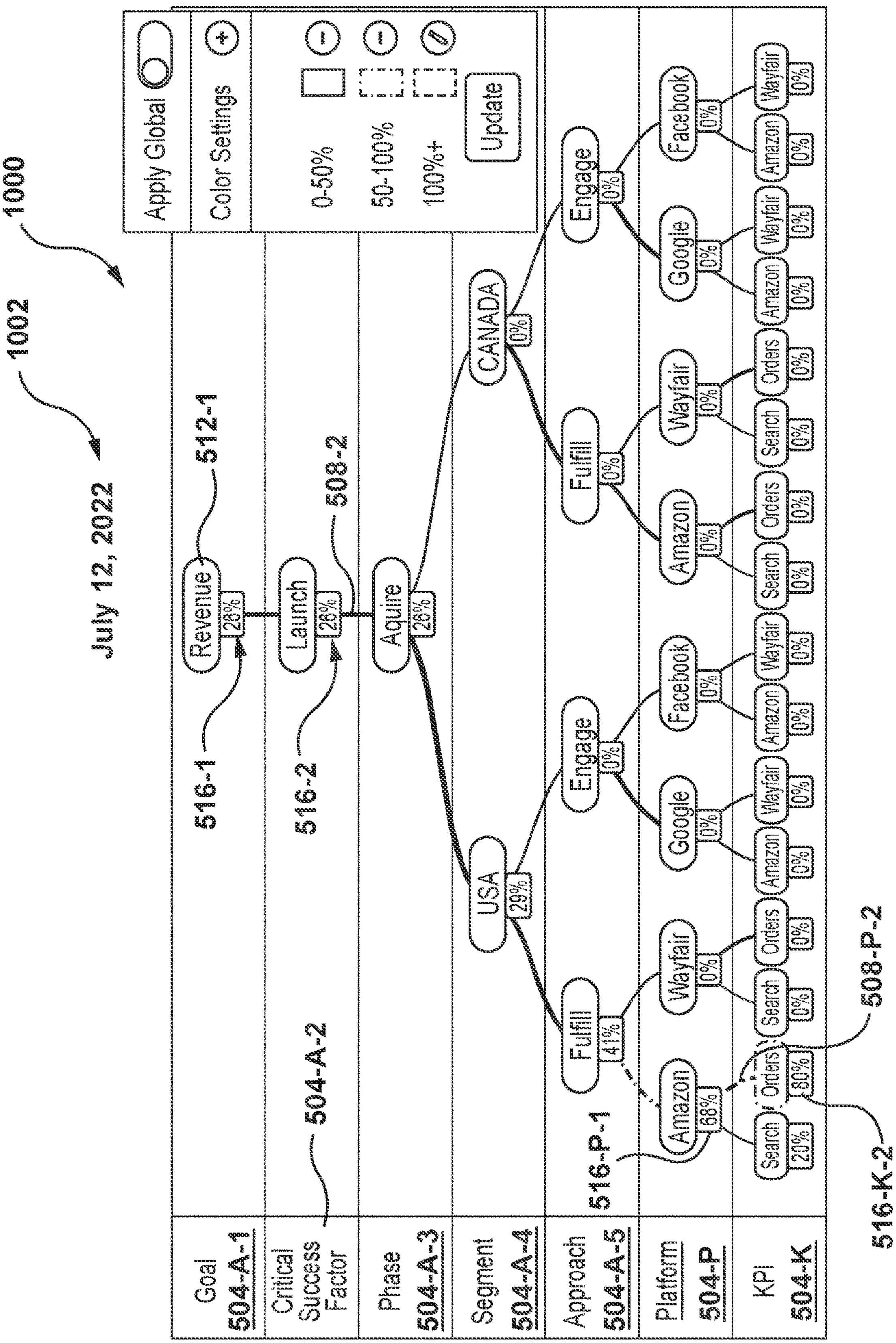
FIG. 12 shows the example of FIG. 11 but iterated to another day.

Referring now to FIG. 12, dashboard 1000 can be configured to dynamically update the colour of edges 508 according to whether a performance indicator 516 in a child node 512 of that edge 508 is within a certain range. For example, if an indicator 516 is between about zero percent and about fifty percent, then the parent edge 508 can be indicated in the color red; if the indicator 516 is between about fifty-one percent and about one hundred percent, then the parent edge 508 can be indicated in the color yellow; if the indicator 516 is above about one-hundred percent then the parent edge 508 can be indicated in the color green. The node 512, itself, respective to the indicator 516, can likewise adhere to the same colour scheme. The number of colors and ranges can be configurable.

Figure 13:
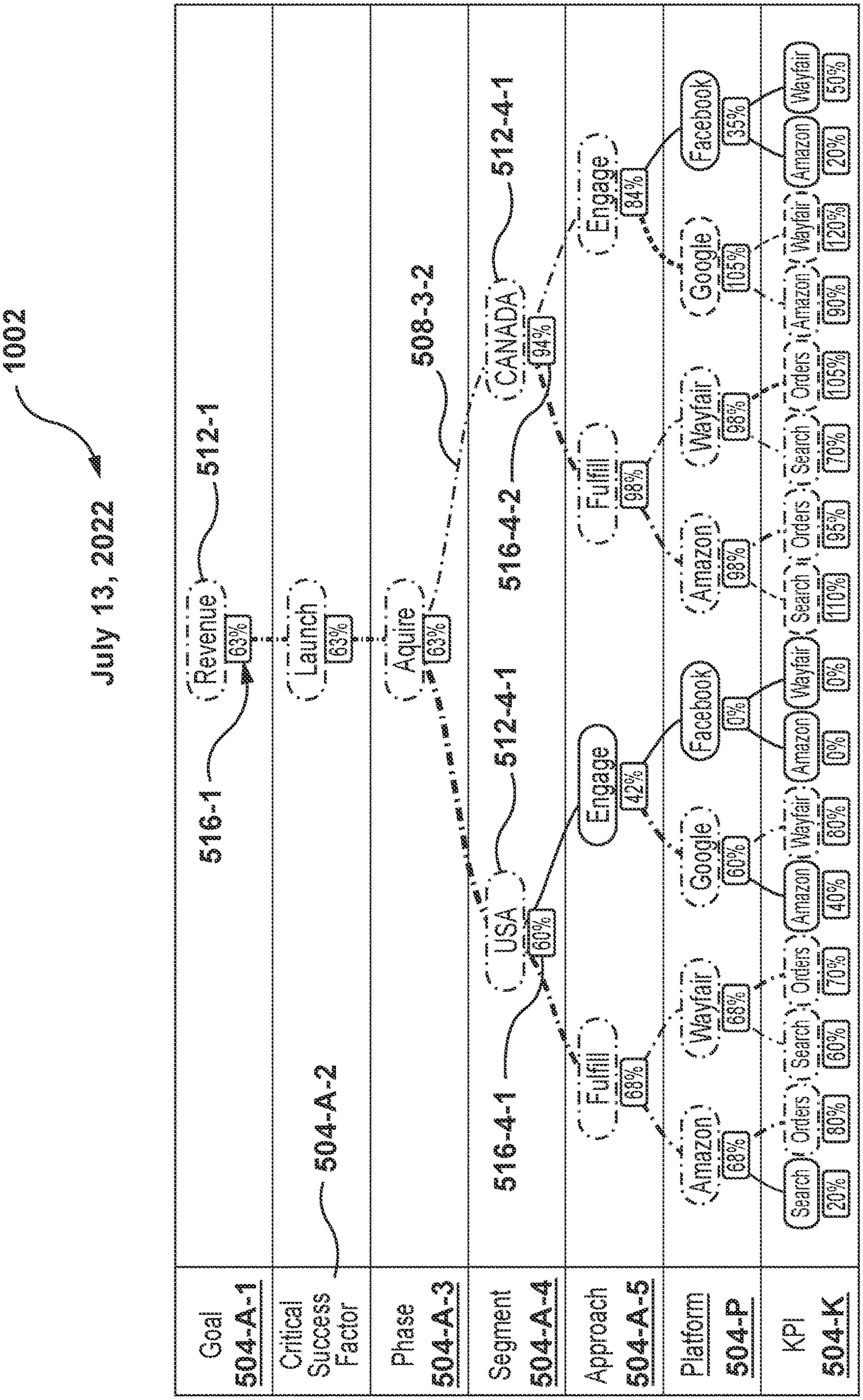
FIG. 13 shows the example of FIG. 12 but iterated to another day.
Figure 14:
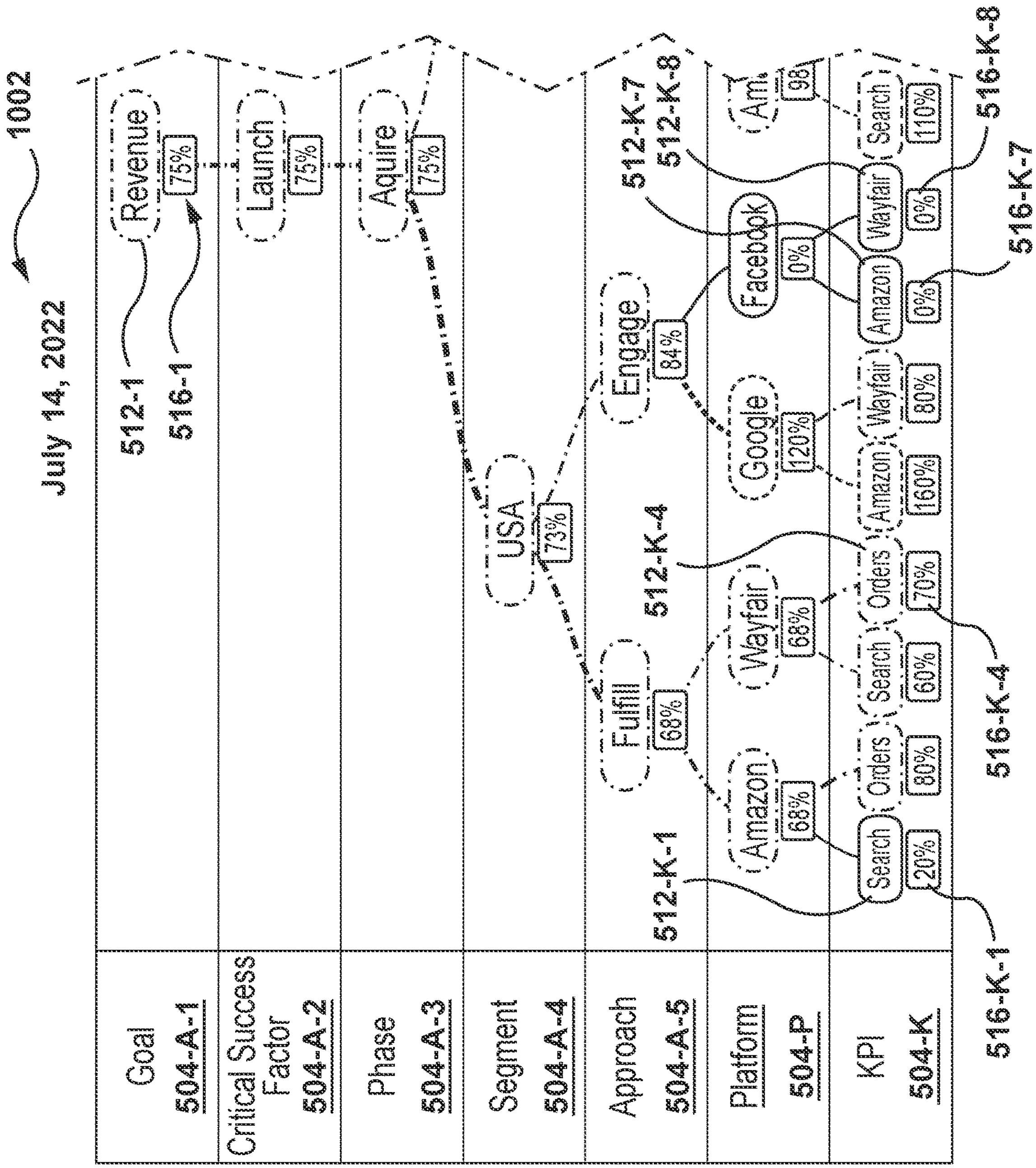
FIG. 14 shows the example of FIG. 12 but only showing a portion of the tree and iterated to another day.
Figure 15:
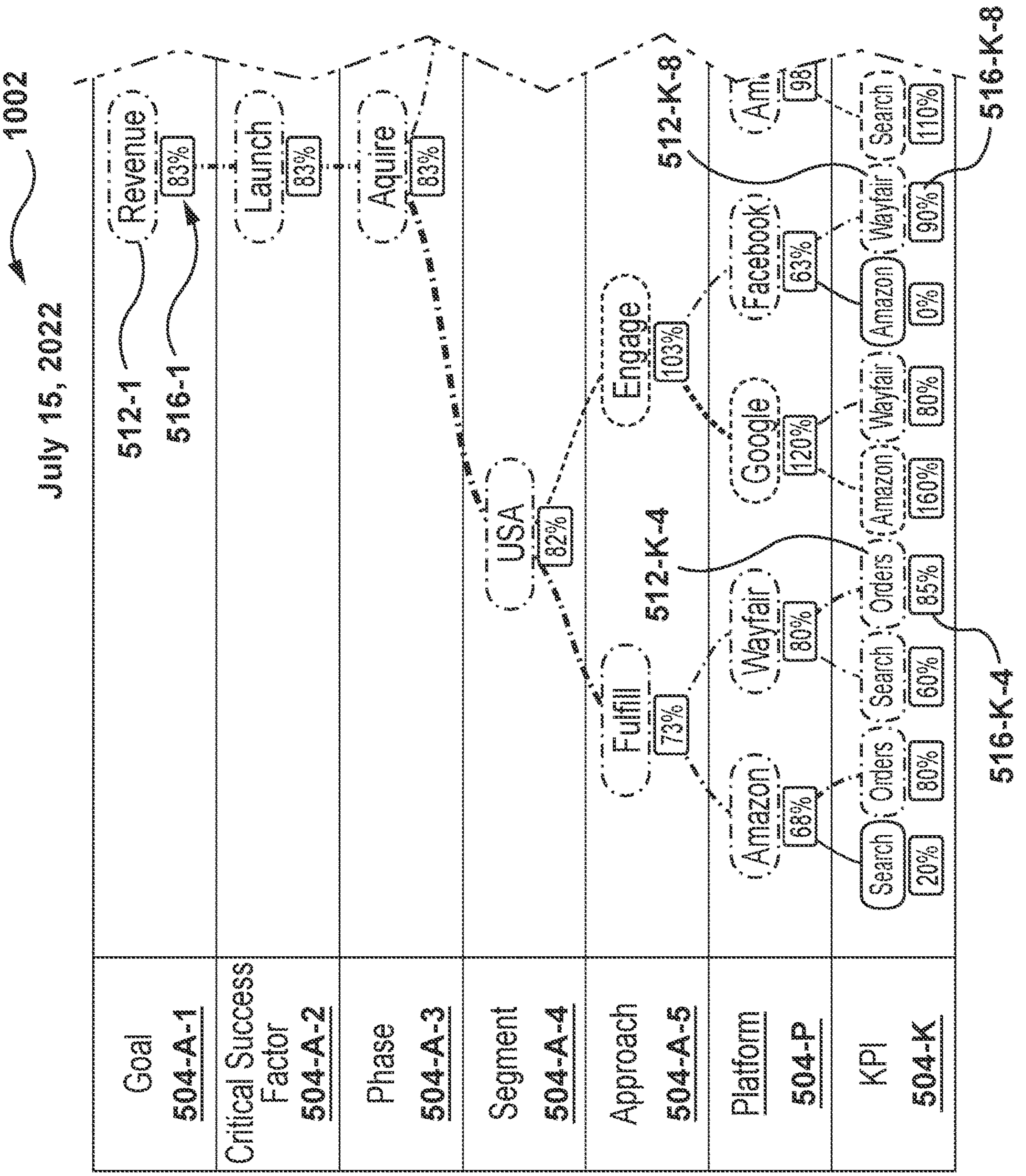
FIG. 15 shows the example of FIG. 14 but iterated to another day.
Figure 19:
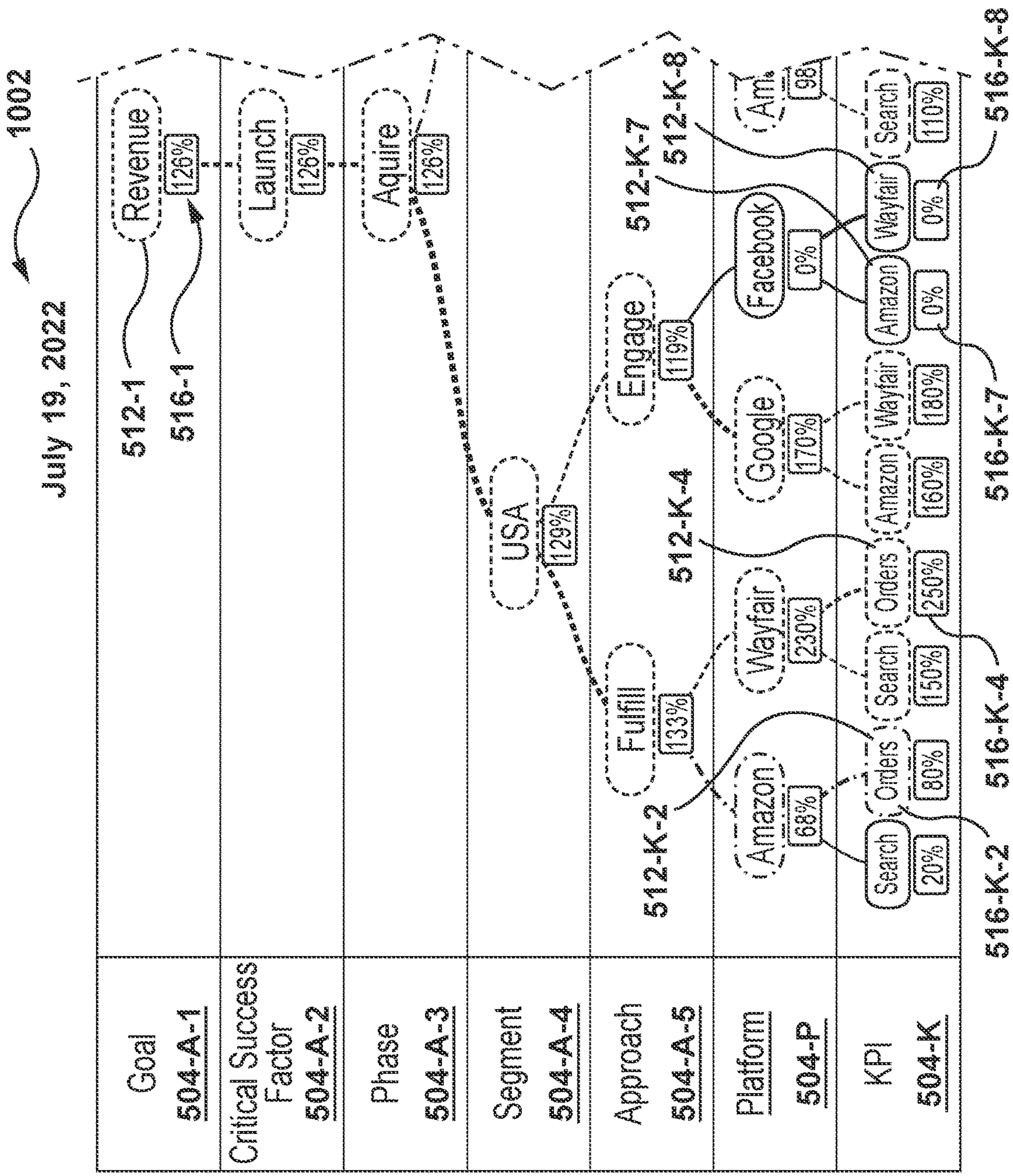
FIG. 19 shows the example of FIG. 17 but iterated to another day.

FIG. 13, FIG. 14, FIG. 15 . . . through FIG. 19 show a progression of days from Jul. 13, 2022 through Jul. 19, 2002 of example adjustments made to campaigns on engagement engines 116-E that strive to drive orders on fulfillment engines 116-F and thereby drive revenue indicator 516-1 as high as possible while reducing utilization of engagement engines 116-E that do not materially improve revenue indicator 516-1.

(FIG. 14 through FIG. 19 only show the "USA" portion of dashboard 1000, as it is assumed that the "Canadian" portion of dashboard 1000 remains static through these examples. Indeed, in FIG. 13, indicator 516-4-2 for "Canada" node 512-4-2 reads "ninety-four percent", and given the relatively small impact of Canada, being weighted at ten percent along edge 508-3-2, can allow dashboard 1000 to be readily examined and understood that it is the branches below "USA" node 512-4-1 that deserve attention in order to improve revenue indicator 516-1.)

FIG. 14 shows that revenue indicator 516-1 is at 75%, and that node 512-K-1, node 512-K-7 and node 512-K-8 have KPI indicators 516K well below fifty percent. Figure shows that revenue indicator 516-1 has increased to 83% as a result of an increase to the KPI associated with indicator 516-K-8 of "Wayfair" node 512-K-8. A resulting increase at Orders node 512-K-4 can be noted that indicator 516-K-4 has increased to 85% on July 15 from 70% on July 14.

In lay terms for the user of dashboard 1000, between July 14 and July 15, a campaign has been pushed out on Facebook engagement engine 116-E-2 that promotes the product on Wayfair fulfillment engine 116-F-2. This has resulted in an increase in the number of orders on the Wayfair fulfillment engine 116-F-2, thereby improving that KPI and ultimately improving revenue. Again, it can be noted that such a campaign can be "turned on" automatically by central engine 104 sending an instruction to fulfillment engine 116-F-2 as a result of thresholds or other criteria for increasing or otherwise varying one or more indicators 516 that are configured in dashboard 1000 and central engine 104.

Figure 16:
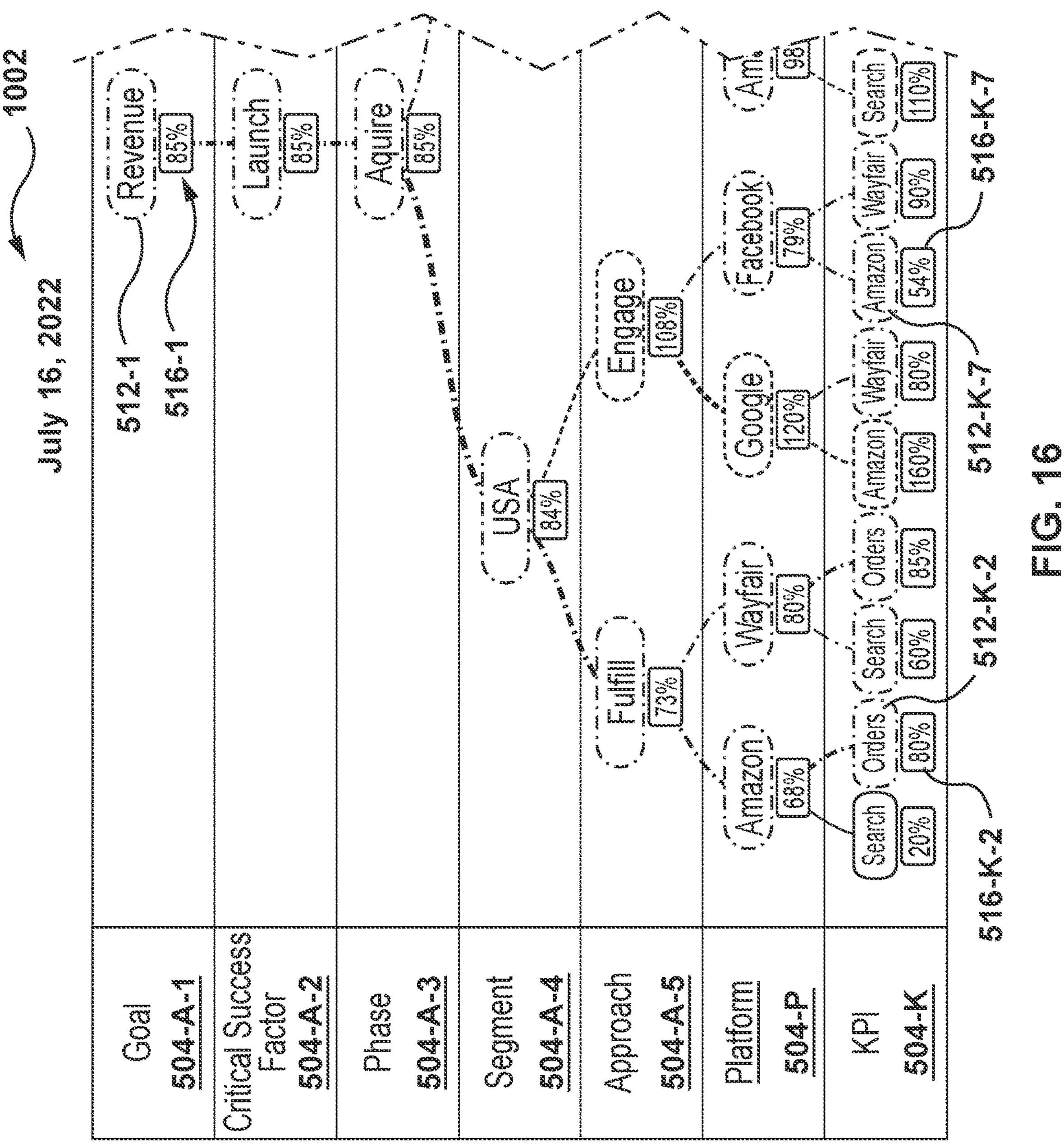
FIG. 16 shows the example of FIG. 15 but iterated to another day.

FIG. 16 shows further campaign adjustments from FIG. 15. FIG. 16 shows that revenue indicator 516-1 has increased to 85% (FIG. 16) from 83% (FIG. 15), as a result of an increase to the KPI associated with indicator 516-K-7 of "Amazon" node 512-K-7. However, no resulting increase at Orders node 512-K-2 can be noted suggesting that the campaign pushed out on Facebook engagement engine 116-E-2 that promotes the product on Amazon fulfillment engine 116-F-1 has not produced any increase in orders of the product, hence the very limited increase in revenue indicator 516-1. In lay terms, the Facebook campaign intending to sell more product over Amazon was not successful, even though resources were allocated to that campaign.

Figure 17:
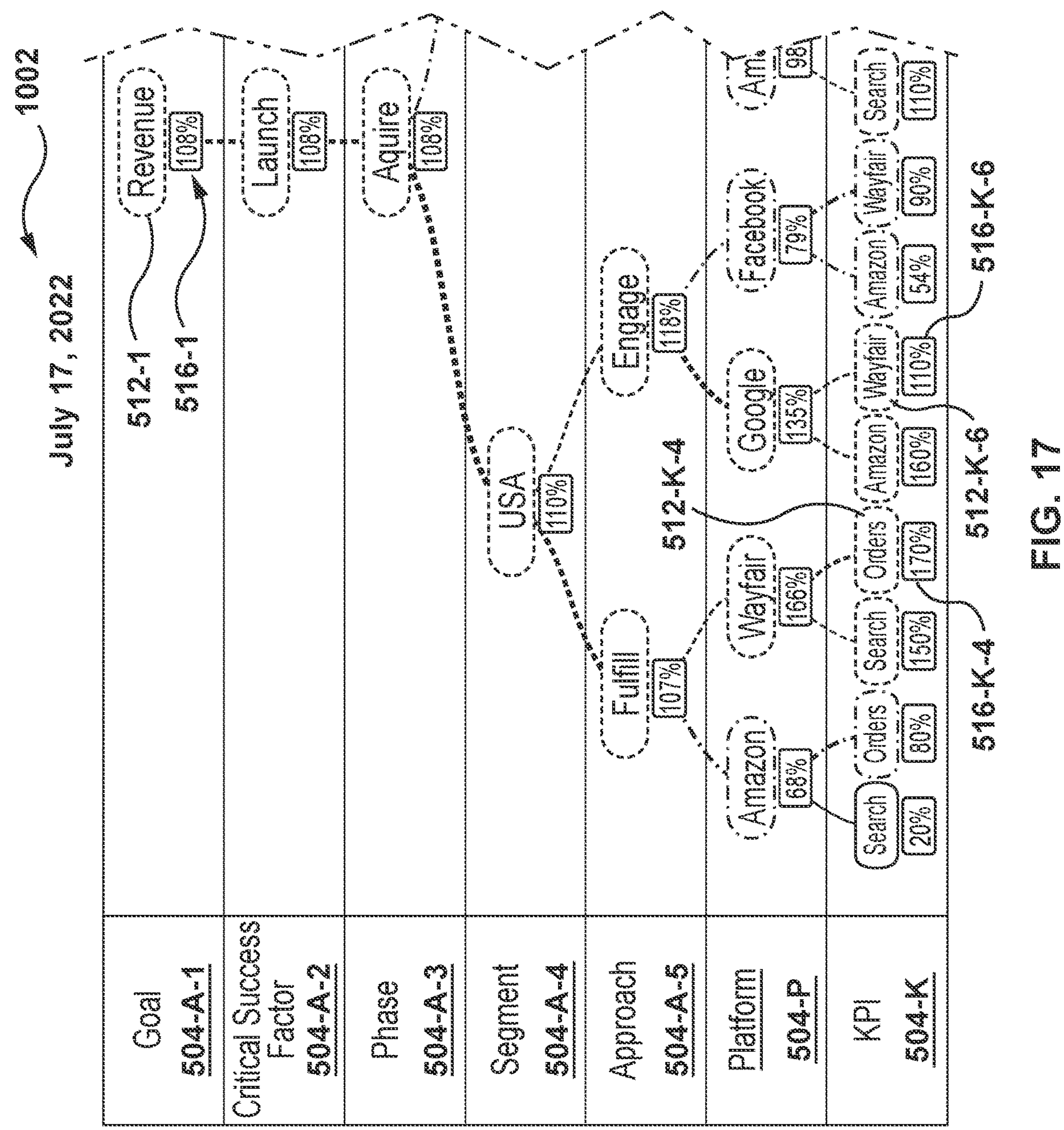
FIG. 17 shows the example of FIG. 16 but iterated to another day.

FIG. 17 shows further campaign adjustments from FIG. 16. FIG. 17 shows that revenue indicator 516-1 has increased to 108% (FIG. 17) from 85% (FIG. 15), as a result of an increase to the KPI associated with indicator 516-K-6 of "Wayfair" node 512-K-6. A resulting increase at Orders node 512-K-4 can be noted that indicator 516-K-4 has increased to 170% on July 17 from 85% on July 16. In lay terms, the Google campaign intending to sell more product over Wayfair was successful, as a result of the resource allocations made to that campaign between July 16 and July 17. So successful, in fact, that revenue indicator 516-1 reached 108%, indicating that the revenue "Goal" was achieved.

Figure 18:
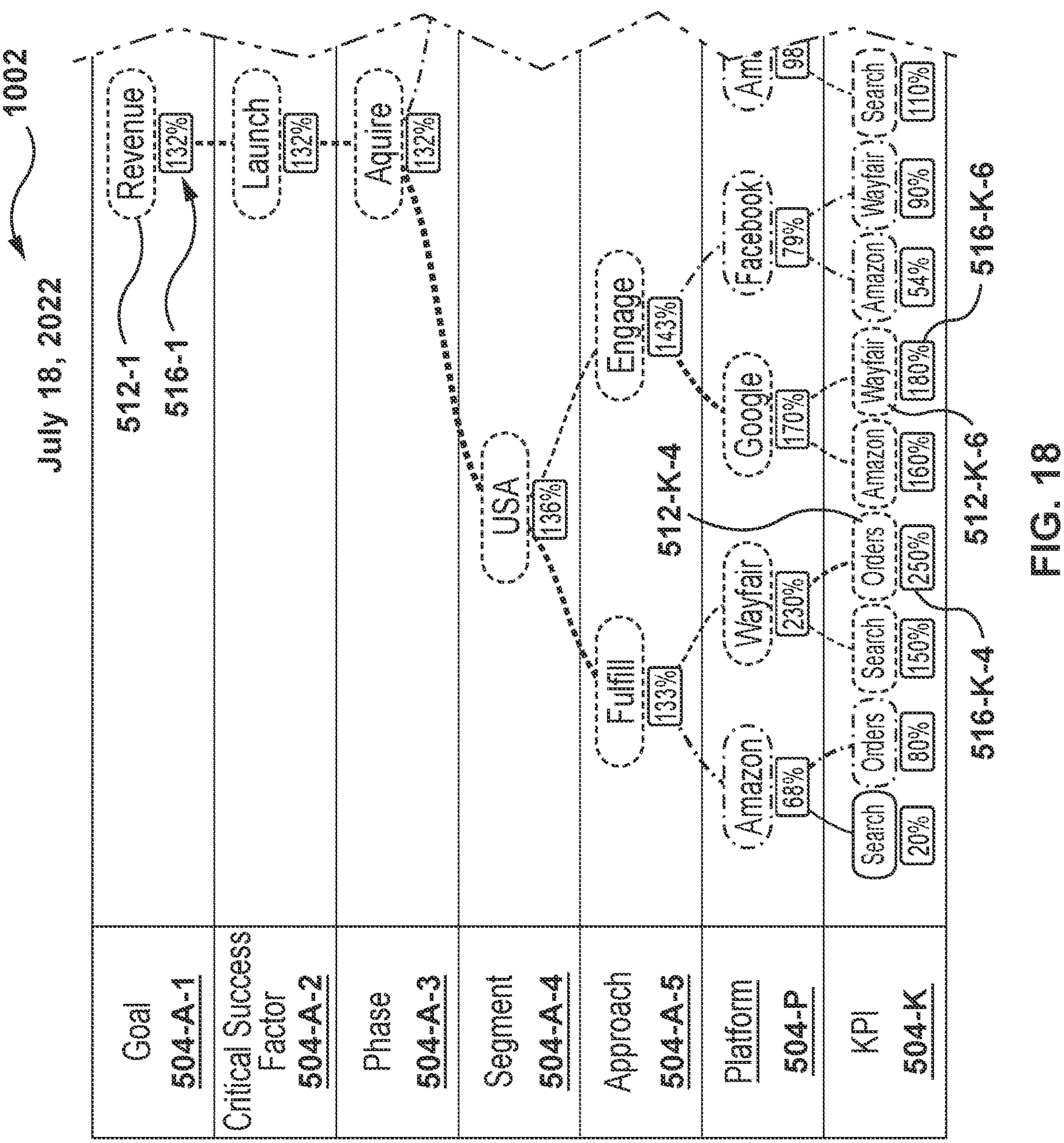
FIG. 18 shows the example of FIG. 17 but iterated to another day.

FIG. 18 shows further campaign adjustments from FIG. 17. FIG. 18 shows that revenue indicator 516-1 has increased to 132% (FIG. 18) from 108% (FIG. 17), as a result of a further increase to the KPI associated with indicator 516-K-6 of "Wayfair" node 512-K-6. A resulting increase at Orders node 512-K-4 can be noted that indicator 516-K-4 has increased to 250% on July 18 from 170% on July 17. In lay terms, the Google campaign intending to sell more product over Wayfair was even more successful after allocating even more resources to that campaign between July 17 and July 18. So successful, in fact, that revenue indicator 516-1 climbed to 132%, indicating that the revenue "Goal" was achieved.

FIG. 19 shows further campaign adjustments from FIG. 18. FIG. 19 shows that revenue indicator 516-1 has decreased slightly to 126% (FIG. 19) from 132% (FIG. 18), as a result of eliminating Facebook engagement engine 116-E-2 altogether from inclusion in e-commerce platform 112, due the cancellation of campaigns for either Amazon or Wayfair fulfillment engines 116-F. Despite the drop, the amount is negligible and the revenue Goal indicator 516-1 remains well above one-hundred percent. Furthermore, the number of orders on node 512-K-2 and node 512-K-4 has not been impacted, while at the same time the computing and network resources that were being wasted by the Facebook engagement engine 116-E-2 have been eliminated, thereby improving the overall technical efficiency of system 100.

It is thus to be understood that dashboard 1000 includes a graphical interface with a tree structure, where each parent node's (i.e. nodes 512-P and upwards) value is derived from a specific formula applied to the values of its child nodes. This computed value not only characterizes the relationship between a parent node 512 and its immediate child nodes 512 but also influences the value at the upper field levels 504. Consequently, through recursive application of this formula from the leaves towards the root, the computed values propagate upwards, culminating in the determination of the root node's (i.e. node 512-1) value. This process embodies a bottom-up computation, with each node 512 serving as a building block for the value of its ancestors, ultimately shaping the overall tree structure and the root node's value. This concept applies even if there are only two levels 504, including a root node 512-1 and a plurality of KPI nodes 504-K.

A person of skill in the art will now appreciate how this very specific but non-limiting example demonstrates the overall scalability and flexibility of system 100 and related teachings herein, to provide a graphical interface that allows for the establishment of targets and KPIs that can be used by non-technical business analysts, while also effecting a significant amount of very complex control over the technological resources of e-commerce platform 112 and streamlining utilization of e-commerce platform 112 towards technological efficient use of network resources as well as server and client device resources. Such controls over e-commerce platform 112 can be highly automated by establishing the nodes 512 and edges 508 of the dashboard 1000, campaigns that can be deployed on engagement engines 116-E, and KPIs at nodes 512-K. Engine 104 can thus automatically adjust campaigns across platform 112 to strive and achieve a "Goal" indicator 516-1 (or other label for field level 504-A-1) that is as high as possible, and ideally over one-hundred-percent, while also trying to reduce and/or minimize utilization of campaigns on engagement engines 116-E. What is notable is that dashboard 1000 itself, is highly customizable according to the underlying infrastructure of e-commerce platform 112, regardless of the technological complexity of the infrastructure, but meanwhile a non-technical business analyst or other user of dashboard 1000 can control e-commerce platform 112 at massive scale, allowing e-commerce platform 112 itself to optimize utilization of e-commerce platform 112 resources.

The use of machine learning can further augment performance of engine 104, as a plurality of campaigns can be administered and therefrom monitored and used to train a machine learning model to more quickly adjust utilization of e-commerce platform 112 resources towards an efficient steady state.

There can be one or more machine-learning algorithms and/or deep learning algorithms and/or neural networks of each application for system 100, which may include, but are not limited to: a generalized linear regression algorithm; a random forest algorithm; a support vector machine algorithm; a gradient boosting regression algorithm; a decision tree algorithm; a generalized additive model; neural network algorithms; deep learning algorithms; evolutionary programming algorithms; Bayesian inference algorithms; reinforcement learning algorithms, and the like. However, generalized linear regression algorithms, random forest algorithms, support vector machine algorithms, gradient boosting regression algorithms, decision tree algorithms, generalized additive models, and the like may be preferred over neural network algorithms, deep learning algorithms, evolutionary programming algorithms, and the like. However, to be clear, any suitable machine-learning algorithm and/or deep learning algorithm and/or neural network is within scope of the present specification.

Figure 20:
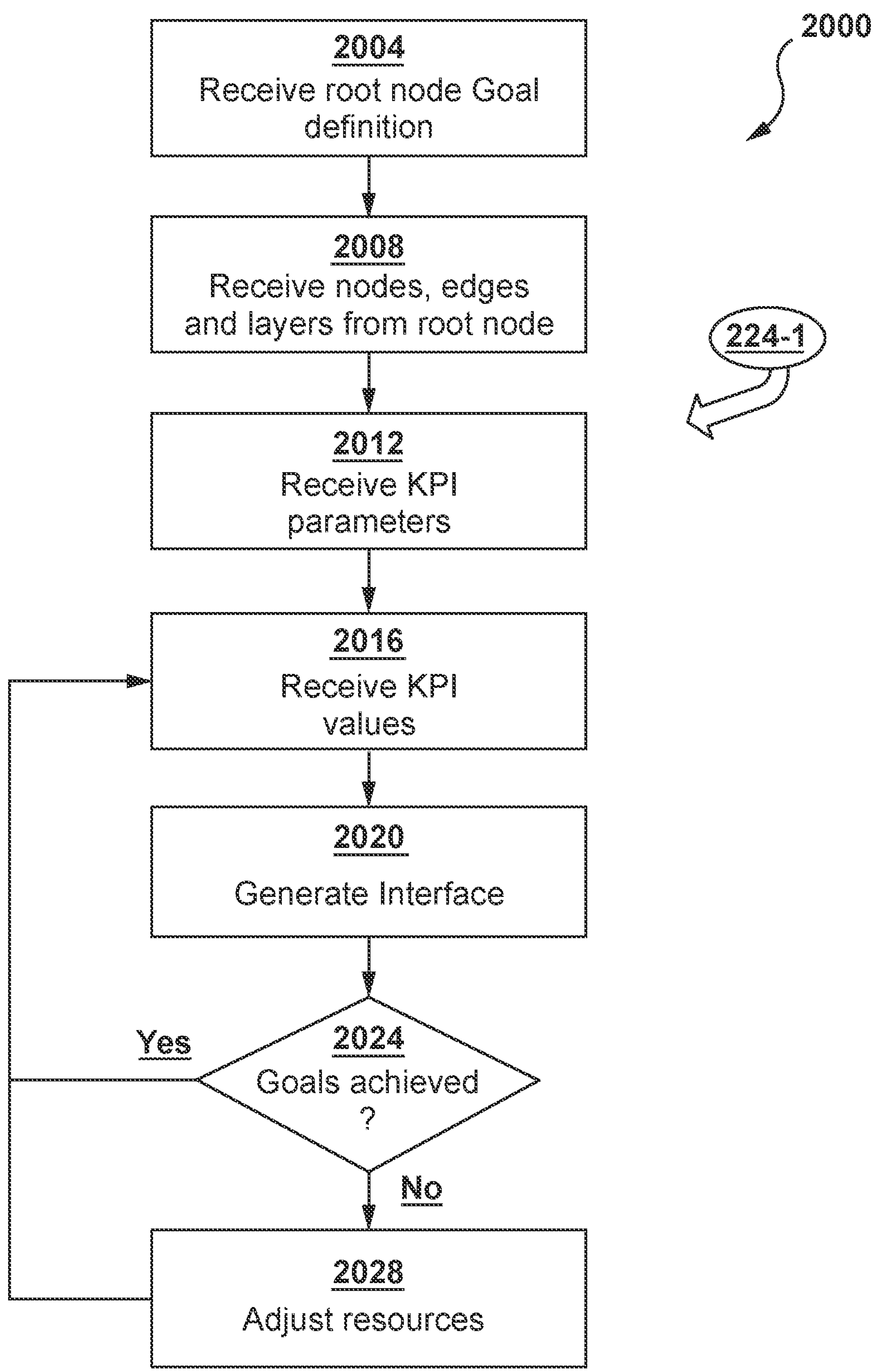
FIG. 20 shows a flowchart depicting a method for generating a graphical interface.

Referring now to FIG. 20, a method 2000 for generation of a graphical interface is provided. Method 2000 complements method 400 and/or can be seen as a variant thereon. Method 2000 can be used to generate, for example, dashboard 1000 or variants thereon. Method 2000 can be used as part of automated control of computing resources such as e-commerce platform 112 or a variant thereon depending on various KPIs to be tracked and goals to be achieved.

Block 2004 comprises receiving a root node goal definition. The aforementioned description of dashboard 1000 in relation to node 512-1 is a non-limiting example of how block 2004 can be effected.

Block 2008 comprises receiving additional nodes, edges and respective layers. The aforementioned description of dashboard 1000 in relation to field level 504-A-2, level 504-A-3, level 504-A-4, level 504-A-5, level 504-P and level 504-K is a non-limiting example of how block 2008 can be effected. Again, note however that the number of levels 504 between the root node level 504-A-1 and the KPI level 504-K is variable—indeed there may be no additional layers if desired, simply having a root node level 504-A-1 and a KPI level 504-K. Weightings can be assigned to each of the edges 508 that connect these nodes 512, as previously discussed.

Block 2012 comprises receiving KPI parameters. The aforementioned description of building nodes 512-K along level 504-K is a non-limiting example of performance of block 2012. Notably, parameters are provided for indicators 516-K, such as a numerator that indicates an actual performance of an activity, and a denominator that indicates a target number of performances of that activity. Date ranges may be associated with these parameters, as discussed earlier.

Block 2016 comprises receiving KPI values. Block 2016 contemplates, for example, the population of numerators within any prescribed time periods, to obtain the actual performance of activities so that they can be compared to a target number of performances and deliver a quantified performance indicator.

Block 2020 comprises generating an interface. Again, dashboard 1000 and its various iterations discussed above are non-limiting example performance of block 2020. An initial performance of block 2020 corresponds to the dashboard 1000 in FIG. 10 and FIG. 11.

Block 2024 comprises determining if the goals have been achieved. In our example, block 2024 comprises determining if the goal of 100% at the root node from block 2004 has been achieved. According to our earlier example, a "yes" determination might be made for Jul. 17, 2022 in FIG. 17, because indicator 516-1 has exceeded 100%, while a "no" determination might be made for Jul. 16, 2022 because indicator 516-1 remains below 100%. The criteria for a "yes" or "no" determination at block 2024 is not particularly limited. Indeed, more complex criteria may include examining any node 512 to ascertain if a particular indicator 516, or one or more indicators 516, has passed a given threshold.

Block 2028 comprises adjusting resources if a "no" determination was made at block 2024. As noted above, an example of adjusting resources can include changing the campaigns at engagement engines 116-E as noted in relation to FIG. 15, FIG. 16, FIG. 17, FIG. 18, and, FIG. 19. Such resource adjustment can be automated, manual or a combination thereof. For example, manual adjustment may include changing advertising campaigns rather than eliminating them, but the deployment of the campaigns may be left fully automated. Other examples, will now occur to those of skill in the art.

As noted, machine learning can be applied at block 2024 and/or block 2028 to support automation.

As will now be apparent from this detailed description, the operations and functions of electronic computing devices described herein are sufficiently complex as to require their implementation on a computer system, and cannot be performed, as a practical matter, in the human mind. Electronic computing devices such as set forth herein are understood as requiring and providing speed and accuracy and complexity management that are not obtainable by human mental steps, in addition to the inherently digital nature of such operations (e.g., a human mind cannot interface directly with RAM or other digital storage, cannot transmit or receive electronic messages, cannot control a display screen, cannot implement a machine learning algorithm, nor implement a machine learning algorithm feedback loop, and the like).

In the foregoing specification, specific embodiments have been described. However, one of ordinary skill in the art will now appreciate that various modifications and changes can be made without departing from the scope of the invention as set forth in the claims below. Accordingly, the specification and figures are to be regarded in an illustrative rather than a restrictive sense, and all such modifications are intended to be included within the scope of present teachings. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art. Furthermore, references to specific percentages should be construed as being "about" the specified percentage.

A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, embodiments can be implemented as a computer-readable storage medium having computer readable code stored thereon for programming a computer (e.g., comprising a processor) to perform a method as described and claimed herein. Any suitable computer-usable or computer readable medium may be utilized. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. In the context of this document, a computer-usable or computer-readable medium may be any medium that can contain, store, communicate, propagate, or transport the program for use by or in connection with the instruction execution system, apparatus, or device.

Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and integrated circuits (ICs) with minimal experimentation. For example, computer program code for carrying out operations of various example embodiments may be written in an object oriented programming language such as Java, Smalltalk, C++, Python, or the like. However, the computer program code for carrying out operations of various example embodiments may also be written in conventional procedural programming languages, such as the "C" programming language or similar programming languages. The program code may execute entirely on a computer, partly on the computer, as a stand-alone software package, partly on the computer and partly on a remote computer or server or entirely on the remote computer or server. In the latter scenario, the remote computer or server may be connected to the computer through a local area network (LAN) or a wide area network (WAN), or the connection may be made to an external computer (for example, through the Internet using an Internet Service Provider).

The invention claimed is:

1. A method for controlling a computer output device comprising:

receiving, in a memory, a definition for a root node, including a performance goal value field;

receiving, in the memory, at least one additional definition for at least one KPI node below the root node, including a relationship value field based on a relationship between an actual performance value and a target performance value;

receiving, in the memory, an edge above each KPI node, including a weighting value field;

receiving, in the memory, at least one threshold performance value for each node;

determining, in a processor connected to the memory, a performance value for the performance goal value field based on a combination of each weighting value field and each relationship value field; and, generating, at the processor, a tree structure from the definitions, including:

the root node, including the performance value;

the additional KPI node, including the relationship value;

the edge above each KPI node including the respective weighting;

and, controlling an output device from the processor based on the threshold performance value in comparison to the performance value.

2. The method of claim 1 wherein the output device is a network interface connected to an engagement engine and the controlling comprises sending an electronic message to the engagement engine adjusting an electronic media campaign within the engagement engine.

3. The method of claim 2 wherein the controlling comprises increasing delivery of the campaign to communication devices if the threshold value is not met.

4. The method of claim 2 wherein the at least one KPI node is based on engagements of the electronic media campaign by communication devices connectable to the engagement engine; and wherein the target performance value is a target number of engagements of the media campaign at the communication devices and the actual performance value is based on the number of actual engagements.

5. The method of claim 2 further comprising at least one additional KPI node based on order fulfillments at a fulfillment engine of a product or service from the media campaign; and wherein the controlling further comprises adjusting the delivery of the campaign based on the threshold performance value associated with the order fulfilments.

6. The method of claim 1 wherein output device is a display and the processor generates the tree structure on the display and the controlling comprises changing a colour of at least one node or at least one edge based on whether the threshold value is met.

7. The method of claim 6 wherein the color is red if the threshold value is below a first value; the colour is green if the threshold value is above a second value; and the colour is yellow if the threshold value is between the first value and the second value.

8. The method of claim 1 further comprising updating the performance value for each node above the KPI nodes each time at least one of the actual performance values change.

9. The method of claim 1 further comprising receiving at least one mid-layer definition of intermediate nodes and weightings between the root node and the KPI nodes; each mid-layer definition including an intermediate performance value field based on the nodes below and propagating upwards to the performance goal value field; the method further comprising determining additional performance values for each intermediate node for propagating upwards.

10. The method of claim 1 wherein each performance target value is a denominator and each actual performance value is denominator and the relationship value field is expressed as a percentage and the performance value goal is expressed as a percentage.

11. A central engine including a processor, memory, an input device and an output device; the memory for storing a plurality of programming instructions for configuring the processor to:

receive a definition for a root node, including a performance goal value field;

receive at least one additional definition for at least one KPI node below the root node, including a relationship value field based on a relationship between an actual performance value and a target performance value;

receive an edge above each KPI node, including a weighting value field;

receive at least one threshold performance value for each node;

determine a performance value for the performance goal value field based on a combination of each weighting value field and each relationship value field; and, generate a tree structure from the definitions, including:

the root node, including the performance value;

the additional KPI node, including the relationship value;

the edge above each KPI node including the respective weighting;

and, control an output device from the processor based on the threshold performance value.

12. The central engine of claim 11 wherein the output device is a network interface connected to an engagement engine and the control comprises sending an electronic message to the engagement engine adjusting an electronic media campaign within the engagement engine.

13. The central engine of claim 12 wherein the control comprises increasing delivery of the campaign to communication devices if the threshold value is not met.

14. The central engine of claim 12 wherein the at least one KPI node is based on engagements of the electronic media campaign by communication devices connectable to the engagement engine; and wherein the target performance value is a target number of engagements of the media campaign at the communication devices and the actual performance value is based on the number of actual engagements.

15. The central engine of claim 12 wherein the instructions further configure the processor to receive at least one additional KPI node based on order fulfillments at a fulfillment engine of a product or service from the media campaign; and wherein the control further comprises adjusting the delivery of the campaign based on the threshold performance value associated with the order fulfilments.

16. The central engine of claim 11 wherein output device is a display and the processor generates the tree structure on the display and the control comprises changing a colour of at least one node or at least one edge based on whether the threshold value is met.

17. The central engine of claim 16 wherein the color is red if the threshold value is below a first value; the colour is green if the threshold value is above a second value; and the colour is yellow if the threshold value is between the first value and the second value.

18. The central engine of claim 11 wherein the instructions further configure the processor to update the performance value for each node above the KPI nodes each time at least one of the actual performance values change.

19. The central engine of claim 11 wherein the instructions further configure the processor to receive at least one mid-layer definition of intermediate nodes and weightings between the root node and the KPI nodes; each mid-layer definition including an intermediate performance value field based on the nodes below and propagating upwards to the performance goal value field; the method further comprising determining additional performance values for each intermediate node for propagating upwards.

20. The central engine of claim 11 wherein each performance target value is a denominator and each actual performance value is denominator and the relationship value field is expressed as a percentage and the performance value goal is expressed as a percentage.

* * * * *